US012680054B2

(12) United States Patent
Yin et al.

(10) Patent No.: US 12,680,054 B2
(45) Date of Patent: Jul. 14, 2026

(54) METHOD OF ENHANCING PERFORMANCE OF A POROUS EVAPORATIVE MEDIA

(71) Applicant: Ecolab USA Inc., St. Paul, MN (US)

(72) Inventors: Zhangzhang Yin, Monroeville, PA (US); Shawn Michael Dalke, Sugar Grove, IL (US); Michael J. Murcia, Sycamore, IL (US); Bingzhi Chen, Naperville, IL (US); Robert M. Lowe, Chicago, IL (US); Carter M. Silvernail, St. Paul, MN (US); Ashish Dhawan, St. Paul, MN (US); Thomas R. Mohs, St. Paul, MN (US)

(73) Assignee: Ecolab USA Inc., St. Paul, MN (US)

( * ) Notice: Subject to any disclaimer, the term of this patent is extended or adjusted under 35 U.S.C. 154(b) by 514 days.

(21) Appl. No.: 18/295,399

(22) Filed: Apr. 4, 2023

(65) Prior Publication Data

US 2023/0314015 A1 Oct. 5, 2023

Related U.S. Application Data

(60) Provisional application No. 63/327,429, filed on Apr. 5, 2022.

(51) Int. Cl.

*C11D 3/36* (2006.01)
*C11D 3/37* (2006.01)
*F24F 6/04* (2006.01)

(52) U.S. Cl.

CPC ............ *C11D 3/361* (2013.01); *C11D 3/3719* (2013.01); *C11D 3/3723* (2013.01); *C11D 3/3757* (2013.01); *F24F 6/04* (2013.01); *F24F 2221/22* (2013.01)

(58) Field of Classification Search

None

See application file for complete search history.

(56) References Cited

U.S. PATENT DOCUMENTS

| | | | |
|---|---|---|---|
| 2,829,732 | A | 4/1958 | Goettl |
| 3,262,682 | A | 7/1966 | Bredberg |
| 3,578,589 | A | 5/1971 | Hwa et al. |
| 3,792,841 | A | 2/1974 | Munters |
| 3,798,057 | A | 3/1974 | Polovina |

(Continued)

FOREIGN PATENT DOCUMENTS

| | | | | |
|---|---|---|---|---|
| CN | 200984843 | Y | 12/2007 | |
| CN | 101528836 | A * | 9/2009 | ............... C08K 3/34 |

(Continued)

OTHER PUBLICATIONS

CN110736385 English translation, accessed on Jul. 2025. (Year: 2020).*

(Continued)

*Primary Examiner* — Kaj K Olsen
*Assistant Examiner* — Arlyn I Rivera-Cordero
(74) *Attorney, Agent, or Firm* — Leydig, Voit & Mayer, Ltd.

(57) ABSTRACT

The method of improving an evaporative performance of a porous evaporative media in a cooling system that utilizes water evaporation for heat transfer, the method comprising contacting the porous evaporative media with a nonionic surfactant, optionally in combination with an antiscalant.

20 Claims, 11 Drawing Sheets

(56) References Cited

U.S. PATENT DOCUMENTS

| | | | | |
|---|---|---|---|---|
| 4,719,083 | A * | 1/1988 | Baker | C23F 11/10 210/764 |
| 4,902,449 | A | 2/1990 | Hobbs | |
| 5,260,117 | A | 11/1993 | Myers et al. | |
| 5,340,651 | A | 8/1994 | Esu | |
| 5,411,666 | A | 5/1995 | Hollis et al. | |
| 5,622,776 | A | 4/1997 | Esu | |
| 5,681,479 | A | 10/1997 | Kerr et al. | |
| 5,849,220 | A | 12/1998 | Batton et al. | |
| 6,039,965 | A | 3/2000 | Donlan et al. | |
| 6,096,225 | A | 8/2000 | Yang et al. | |
| 6,365,101 | B1 | 4/2002 | Nguyen et al. | |
| 8,591,747 | B2 | 11/2013 | Little et al. | |
| 9,383,142 | B2 | 7/2016 | Habeebullah | |
| 11,085,010 | B2 | 8/2021 | Hu et al. | |
| 11,155,480 | B2 | 10/2021 | Moloney et al. | |
| 2005/0001339 | A1 | 1/2005 | Yeager et al. | |
| 2008/0039358 | A1 | 2/2008 | Rodrigues | |
| 2010/0000579 | A1 | 1/2010 | Reinbold et al. | |
| 2012/0032093 | A1 * | 2/2012 | Moore | E21B 37/06 526/263 |
| 2013/0000329 | A1 | 1/2013 | Smith et al. | |
| 2017/0297938 | A1 * | 10/2017 | Drewniak | C23F 11/173 |
| 2019/0257583 | A1 * | 8/2019 | Zhao | F28F 3/027 |
| 2021/0032575 | A1 | 2/2021 | Dahlquist Howlett et al. | |

FOREIGN PATENT DOCUMENTS

| | | | | |
|---|---|---|---|---|
| CN | 104046438 | A | 9/2014 | |
| CN | 107285491 | A | 10/2017 | |
| CN | 108033577 | A | 5/2018 | |
| CN | 110736385 | A | 1/2020 | |
| CN | 110980897 | A | 4/2020 | |
| EP | 0544345 | B1 | 8/1996 | |
| EP | 1192108 | B1 | 5/2009 | |
| GB | 1173567 | A | 12/1969 | |
| GB | 1519512 | | 7/1978 | |
| JP | 2004012042 | A * | 1/2004 | C02F 1/50 |
| JP | 4992458 | B2 | 8/2012 | |
| JP | 4992476 | B2 | 8/2012 | |
| JP | 5631516 | B1 | 11/2014 | |
| JP | 2021-010894 | A | 2/2021 | |
| WO | WO 2000/076922 | A2 | 12/2000 | |
| WO | WO 2014/011655 | A1 | 1/2014 | |
| WO | WO 2015/199676 | A1 | 12/2015 | |
| WO | WO 2018/069393 | A1 | 4/2018 | |
| WO | WO 2020/011764 | A1 | 1/2020 | |

OTHER PUBLICATIONS

CN101528836 English translation, accessed on Jul. 2025. (Year: 2009).*

JP2004012042 English translation, accessed on Jul. 2025. (Year: 2004).*

Cao et al., "A multicarboxyl antiscalant for calcium phosphate and calcium carbonate deposits in cooling water systems," abstract, *Desalination and Water Treatment*, 52(37-39): 7258-7264 (2013).

Tejero-González et al., "Optimal operation of evaporative cooling pads: A review," *Renewable and Sustainable Energy Reviews*, 151: 111632 (2021).

European Patent Office, International Search Report in International Patent Application No. PCT/US2023/017392, 5 pp. (Jul. 28, 2023).

European Patent Office, Written Opinion in International Patent Application No. PCT/US2023/017392, 8 pp. (Jul. 28, 2023).

* cited by examiner

Surfactant

Baseline

Surfactant + Antiscalant

METHOD OF ENHANCING PERFORMANCE OF A POROUS EVAPORATIVE MEDIA

CROSS-REFERENCE TO PRIOR APPLICATIONS

This application claims benefit to U.S. Provisional Patent Application No. 63/327,429, filed Apr. 5, 2022, which is hereby incorporated by reference in its entirety.

BACKGROUND OF THE INVENTION

Air Handling Units (AHUs), which include adiabatic cooling systems, evaporative cooling systems, and humidification systems, can provide cooling and/or humidification functions in industrial applications such as data centers, automotives, and agricultural buildings. For example, adiabatic (or evaporative) cooling systems provide an effective way to remove the significant heat load generated by a data center. Evaporative cooling systems generally draw heated air through porous evaporative media, which is generally made with layers of corrugated porous (e.g., fibrous) sheet materials with large surface area and airways allowing air to pass through. A hyperscale facility can have dozens of data halls and each data hall can have dozens of adiabatic cooling units that contain several adiabatic media pads. As water evaporates from the pads, the surrounding air is cooled. The cooled air is pushed or drawn out of the adiabatic cooling system to the warmer environment.

During the evaporation process, minerals in the water (e.g., calcium, magnesium, and silicate) may reach saturation, thereby resulting in scale formation, which, in-turn, can reduce the useful life of the media. When too much scale accumulates, airways can become blocked, reducing water saturation and evaporation, and, thus, reducing cooling/humidification efficiency.

Unlike conventional scale control in other types of cooling systems, such as cooling towers and boilers, which require treatment of scale on a solid surface, the porous nature of the media used in these Air Handling Units (AHUs) provides ideal scale initiation and growth sites within the media. While the deposition of scale in such other types of cooling systems (e.g., cooling towers and boilers) is also of major concern, the deposition merely exists on the surface. In contrast, in the case of porous evaporative media, the scale is embedded within the material, making it rather challenging to control scale formation.

Thus, there remains a need for methods of inhibiting scale formation within porous evaporative media used in cooling systems such as data centers, automotives, and agricultural buildings. The invention provides such methods. These and other advantages of the invention, as well as additional inventive features, will be apparent from the description of the invention provided herein.

BRIEF SUMMARY OF THE INVENTION

The invention provides a method of improving an evaporative performance (e.g., by inhibiting scale formation within the porous evaporative media) of porous evaporative media in a cooling system that utilizes water evaporation for heat transfer, the method comprising contacting the porous evaporative media with a nonionic surfactant, optionally in combination with an antiscalant.

The invention also provides a method of improving an evaporative performance (e.g., by inhibiting scale formation within the porous evaporative media) of porous evaporative media in a cooling system that utilizes water evaporation for heat transfer, the method comprising contacting the porous evaporative media with a nonionic surfactant (e.g., scale redistributing-effective or scale relocating-effective amount of a nonionic surfactant).

The invention further provides a method of improving an evaporative (e.g., by inhibiting scale formation within the porous evaporative media) performance of porous evaporative media in a cooling system that utilizes water evaporation for heat transfer, the method comprising contacting the porous evaporative media with a nonionic surfactant (e.g., a scale relocating-effective amount of a nonionic surfactant) and an antiscalant (e.g., a scale inhibiting-effective amount of an antiscalant).

BRIEF DESCRIPTION OF THE DRAWINGS

FIG. 5A shows the front of the industrial scale adiabatic cooling/humidification unit and FIGS. 5B and 5C show a close-up view of the surface of the porous media.

FIG. 6A shows the front of the industrial scale adiabatic cooling/humidification unit and FIGS. 6B and 6C show a close-up view of the surface of the porous media.

FIG. 7A shows the front of the industrial scale adiabatic cooling/humidification unit and FIGS. 7B and 7C show a close-up view of the surface of the porous media.

DETAILED DESCRIPTION OF THE INVENTION

Figure 1:
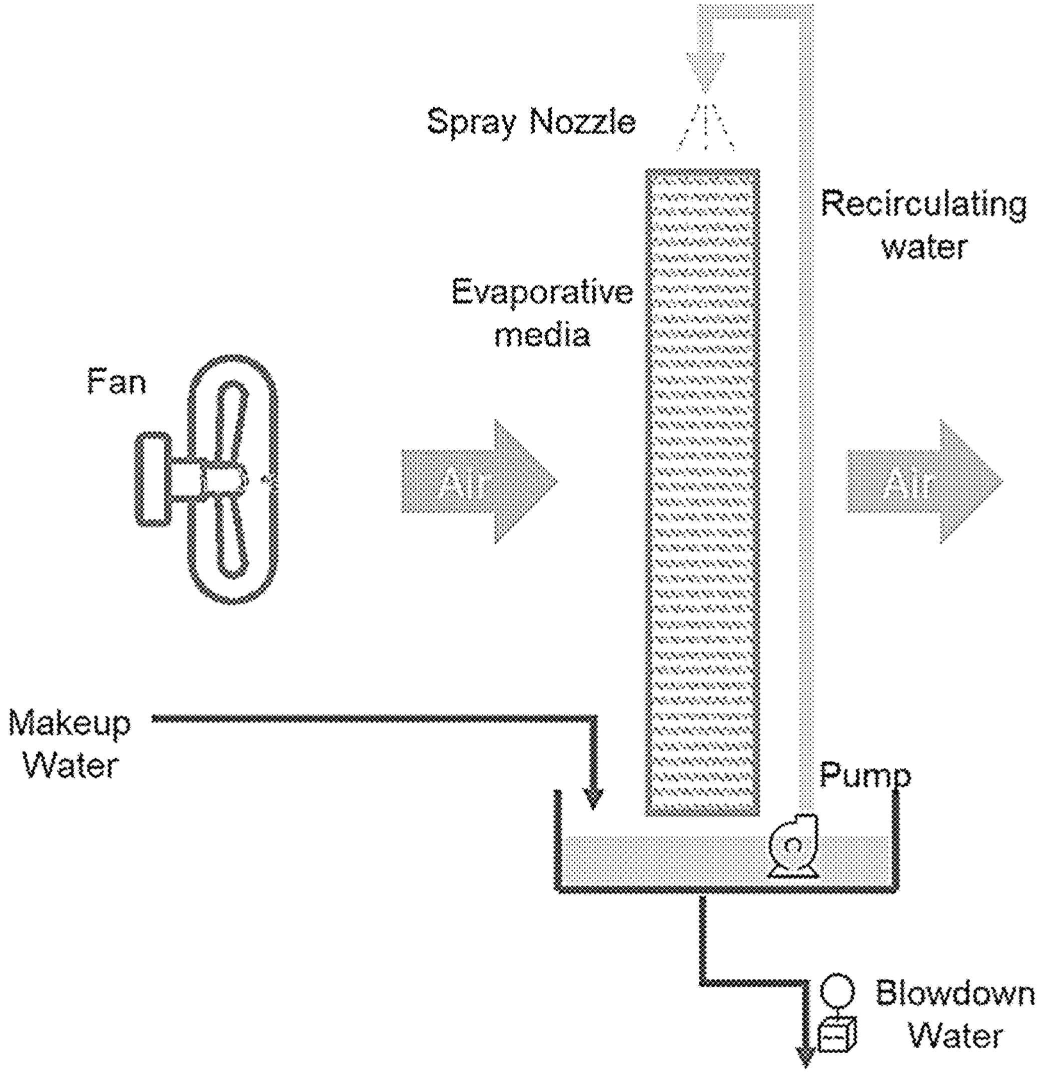
FIG. 1 depicts an exemplary adiabatic cooling/humidification unit having a media holder, a sump, a water recirculation system (pump, pipe, and spray nozzle), air flowing system (fan and air conduit), makeup water, and blow down control.

The invention provides a method of improving an evaporative performance of a porous evaporative media in a cooling system that utilizes water evaporation for heat transfer, the method comprising contacting the porous evaporative media with a nonionic surfactant, optionally in combination with an antiscalant.

In some embodiments, the method of improving an evaporative performance of a porous evaporative media in a cooling system that utilizes water evaporation for heat transfer, comprises contacting the porous evaporative media with a nonionic surfactant (e.g., scale redistributing-effective or scale relocating-effective amount of a nonionic surfactant). In such embodiments, the method may comprise contacting the porous evaporative media with a nonionic surfactant in the absence of (or without) an antiscalant. Thus, in some embodiments, the method comprises contacting the porous evaporative media with a scale relocating-effective amount of the nonionic surfactant and substantially no antiscalant (i.e., less than 5 ppm of an antiscalant, less than 1 ppm of an antiscalant, less than 500 ppb of an antiscalant, or less than 100 ppb of an antiscalant). In other embodiments, the method comprises contacting the porous evaporative media with a scale relocating-effective amount of the nonionic surfactant and substantially no antiscalant.

In some embodiments, the method of improving an evaporative performance of a porous evaporative media in a cooling system that utilizes water evaporation for heat transfer, comprises contacting the porous evaporative media with a nonionic surfactant (e.g., a scale redistributing-effective or scale relocating-effective amount of a nonionic surfactant) and an antiscalant (e.g., a scale inhibiting-effective amount of an antiscalant).

The methods described herein may be used for redistributing or relocating scale formation and/or inhibiting scale formation of a porous evaporative media in an industrial cooling system. Without wishing to be bound by any particular theory, it is believed that the nonionic surfactant redistributes or relocates the scale formation away from the internal porous structure of the porous evaporative media to the outer surface of the porous evaporative media. It is believed that the antiscalant may further aid in this process, as well as help to inhibit (e.g., reduce) the amount of scale formation generally. Thus, the methods of the invention improve evaporative performance, for example, by inhibiting scale formation within the regions of porous evaporative media which have the potential to be most critical to evaporative performance. As used herein, the term "scale" can refer to any salt or mineral deposit (e.g., calcium salts, magnesium salts, barium salts, silicates, phosphates, carbonates, sulfates, and combinations thereof), which accumulates on (e.g., at the surface or within) a porous evaporative media in an industrial cooling system. Generally, the scale deposits that form in Air Handling Units (AHUs), which include, for example, adiabatic cooling systems, evaporative cooling systems, and humidification systems, as a result of water evaporation and concentration of the salt or mineral in the cooling system. In some embodiments, the methods described herein reduce the weight of scale formation per day of cooling system operation, as determined by the dry weight of the porous evaporative media before and after operation.

The methods of the invention are particularly useful for relocating (e.g., redistributing) scale formation to outer surfaces and/or inhibiting scale formation of a porous evaporative media. As used herein, the term "porous evaporative media" refers to any media having pores (i.e., airways) to provide an increased surface area, which helps facilitate the evaporation of a solvent (e.g., water). In some embodiments, the porous evaporative media comprises one or more corrugated sheets. For example, the porous media may comprise 1 corrugated sheet, 2 or more corrugated sheets, 5 or more corrugated sheets, 10 or more corrugated sheets, 20 or more corrugated sheets, 50 or more corrugated sheets, 100 or more corrugated sheets, 500 or more corrugated sheets, or 1000 or more corrugated sheets). Generally, the porous evaporative media comprises more than one corrugated sheet, which include media in which the corrugated sheets are held together, e.g., by an adhesive. The porous evaporative media (e.g., corrugated sheets) may include any suitable porous material (e.g., a fibrous material, a filler, a binder (e.g., a polymer binder), or a combination thereof). In some embodiments, the porous evaporative media includes corrugated sheets of a fibrous material (e.g., cellulosic fibers, glass fibers, plastic fibers, or a combination thereof), a filler (e.g., a clay filler, a silica filler, or a combination thereof), a polymer binder, or a combination thereof. In some embodiments, the porous evaporative media includes corrugated sheets of a fibrous material (e.g., cellulosic fibers, glass fibers, plastic fibers, or a combination thereof), a filler (e.g., a clay filler, a silica filler, or a combination thereof), and a polymer binder. In some embodiments, for example, the evaporative porous media comprises cellulose, fiberglass, or a combination thereof.

The methods described herein include contacting the evaporative media with (a) a nonionic surfactant (e.g., a scale redistributing-effective or scale relocating-effective amount of a nonionic surfactant) or (b) a nonionic surfactant (e.g., a scale redistributing-effective or scale relocating-effective amount of a nonionic surfactant) and an antiscalant (e.g., a scale inhibiting-effective amount of an antiscalant). Without wishing to be bound by any particular theory, it is believed that the nonionic surfactant redistributes or relocates the scale formation from within the inner surfaces of the porous evaporative media to the outer surface of the porous evaporative media. It is further believed that that the combination of an antiscalant and a nonionic surfactant is particularly effective in for relocating (e.g., redistributing) and/or inhibiting scale formation of a porous evaporative media, which provides an ideal surface for scale initiation and growth sites. More particularly, it is believed that the antiscalant and nonionic surfactant may synergistically combine to effectively deliver the antiscalant into the pores (i.e., airways) of the evaporative media, thereby improving the efficacy of antiscalant within the porous evaporative media and relocate the scale formation to the outer surface of the porous evaporative media.

The antiscalant used in the method of the invention may include any suitable compound capable of inhibiting scale formation. The nonionic surfactant used in the method of the invention may include any surfactant that does not carry a charge at neutral, acidic, or alkaline pH (e.g., an alkylene oxide polymer or copolymer).

In some embodiments, the antiscalant includes an organophosphorus compound. For example, the antiscalant may include organophosphonic acid, an organophosphinic acid, a salt thereof, or a combination thereof. An exemplary list of organophosphorus compounds includes, but is not limited to, aminotrismethylenephosphonic acid (AMP), 1-hydroxyethylidene-1,1-diphosphonic acid (HEDP), 2-phosphonobutane-1,2,4-tricarboxylic acid (PBTC), polyamino polyether methylene phosphonate (PAPEMP), ethylenediamine tetramethylene phosphonic acid (EDTMPA), diethylenetriamine pentamethylene phosphonic acid (DTPMPA), hexamethylenediamine tetramethylene phosphonic acid (HMDTMPA), bis(hexamethylenetriamine pentamethylene phosphonic acid) (BHMTPMP), hydroxyethylamino di(methylene phosphonic acid) (HEMPA) hydroxyphosphonoacetic acid (HPA), phosphine succinic oligomer (PSO), a salt thereof, or a combination thereof.

Alternatively, or additionally, the antiscalant may include a polymer and/or copolymer which includes one or more monomers selected from (meth)acrylic acid, (meth)acrylamide, hydroxypropylacrylate, 2-acrylamido-2-methyl propane sulfonate, maleic anhydride, sulfonated styrene, tertiary butyl acrylamide, vinyl carboxylates, aspartic acid, sulfonic acids, salts thereof, and combinations thereof. For example, the antiscalant may include polymaleic anhydride, hydrolyzed polymaleic acid (HPMA), poly(meth)acrylic acid, poly(meth)acrylamide, polyaspartic acid (pAsp), polysulfonic acid, adipic acid, a vinyl dicarboxylic acid, an alkyl epoxy carboxylate, a salt thereof, or a combination thereof. Similarly, the antiscalant may include a copolymer which includes a monomer selected from (meth)acrylic acid, (meth)acrylamide, hydroxypropylacrylate, 2-acrylamido-2-methyl propane sulfonate, maleic anhydride, sulfonated styrene, tertiary butyl acrylamide, a salt thereof, and combinations thereof. For example, the antiscalant may include a (meth)acrylic acid/(meth)acrylamide copolymer (AA/AM), a (meth)acrylic acid/hydroxypropylacrylate copolymer (AA/HPA), a (meth)acrylic acid/2-acrylamido-2-methyl propane sulfonate copolymer (AA/AMPS), a maleic anhydride/sulfonated styrene copolymer (MA/SS), a (meth) acrylic acid/(meth)acrylamide/tertiary butyl acrylamide copolymer (AA/AM/t-BAM), a (meth)acrylic acid/2-acrylamido-2-methyl propane sulfonate/tertiary butyl acrylamide copolymer (AA/AMPS/t-BAM), a (meth)acrylic acid/sulfonated styrene/2-acrylamido-2-methyl propane sulfonate copolymer (AA/SS/AMPS), a (meth)acrylic acid/(meth)acrylamide/aminomethyl sulfonate copolymer (AA/AM/AMS), a 2-propenoic acid and alpha-2-propenyl-omega-hydroxypoly(oxy-1,2-ethanediyl) copolymer (e.g., PAP/PHXOED-Na), a salt thereof, or a combination thereof.

In some embodiments, the antiscalant comprises a copolymer of 2-acrylamido-2-methyl-1-propanesulfonic acid and acrylic acid (poly(AA/AMPS)), a copolymer of 2-acrylamido-2-methyl-1-propanesulfonic acid and acrylic acid (poly(AA/AMPS)), a copolymer of acrylic acid, sulfonic acid and sulfonated styrene, polyacrylic acid (poly(AA)), a copolymer of acrylic acid, vinyl dicarboxylic acid, sulfonic acid and nonionic monomer, polyaspartic acid (pASP), hydrolyzed polymaleic acid (HPMA), polymethacrylic acid (PMAA), polymaleic anhydride (PMA), 2-phosphonobutane-1,2,4,-tricarboxylic acid (PBTC), polyamino polyether methylene phosphonate (PAPEMP), phosphinosuccinic oligomer (PSO), or a combination thereof. In certain embodiments, the antiscalant comprises polymaleic anhydride, hydrolyzed polymaleic acid (HPMA)), or a combination thereof. In preferred embodiments, the antiscalant comprises hydrolyzed polymaleic acid (HPMA)).

In some embodiments, the nonionic surfactant may include a polyethylene oxide, a polypropylene oxide, a polyethylene oxide/polypropylene oxide (i.e., ethylene oxide/propylene oxide copolymer), or a combination thereof. When the nonionic surfactant includes polyethylene oxide/polypropylene oxide copolymer, the ethylene oxide and propylene oxide monomers may be arranged in any suitable orientation. For example, the polyethylene oxide/polypropylene oxide may include a block copolymer, a random copolymer, a graft copolymer, or an alternating copolymer.

Alternatively, or additionally, the nonionic surfactant may include a $C_8$-$C_{22}$ alcohol ethoxylate, a $C_8$-$C_{22}$ ethoxylate, a $C_8$-$C_{22}$ alkyl phenol ethoxylate (e.g., dodecyl phenol ethoxylate, nonyl phenol ethoxylate, octyl phenol ethoxylate, etc.), a terminally blocked $C_8$-$C_{22}$ alcohol polyethylene glycol ether, a monododecyl ether, a nonoxynol, an ethoxylated $C_8$-$C_{22}$ ester, an ethoxylated amine (e.g., a tallow amine, a coco amine, a stearyl amine, an oleyl amine, etc.), a $C_8$-$C_{22}$ amide, a polyethoxylated tallow amine, a poloxamer, a $C_8$-$C_{22}$ ester of a polyhydroxy compound (e.g., a $C_8$-$C_{22}$ ester of glycerol, a $C_8$-$C_{22}$ ester of sorbitol, a $C_8$-$C_{22}$ ester of sucrose, etc.), an alkyl polyglucoside, myristamine oxide, or a combination thereof.

In some embodiments, the nonionic surfactant includes an oxyalkylated alcohol (e.g., a $C_8$-$C_{22}$ alcohol ethoxylate such as ethoxylated tridecyl alcohol). In certain embodiments, the nonionic surfactant includes a polyethylene oxide polymer, a polypropylene polymer, a polyethylene oxide/polypropylene oxide copolymer, octaethylene glycol monododecyl ether, pentaethylene glycol monododecyl ether, Triton X-100, cocamide monoethanolamine, cocamide diethanolamine, glycerol monostearate, glycerol monolaurate, sorbitan monolaurate, sorbitan monostearate, sorbitan tristearate, Tween 20, Tween 40, Tween 60, Tween 80, decyl glucoside, lauryl glucoside, octyl glucoside, or a combination thereof.

As used herein, the term "scale relocating-effective amount" refers to any amount of the nonionic surfactant necessary to help relocate scale formation from within the porous evaporative media to the surface of the porous evaporative media.

As used herein, the term "scale inhibiting-effective amount" refers to any amount of the antiscalant necessary to help inhibit the formation of scale within the evaporative media. In some embodiments, as a result of the presence of the nonionic surfactant, the antiscalant may increase formation of scale at the surface; however, the overall scale weight increase is reduced by the antiscalant.

In some embodiments, the method may provide a concentration of about 1 ppm or more of the antiscalant in the cooling water, for example, about 10 ppm or more, about 50 ppm or more, or about 100 ppm or more. Alternatively, or additionally, the method may provide a concentration of about 10,000 ppm or less of the antiscalant in the cooling water, for example, about 5,000 ppm or less, about 1,000 ppm or less, about 500 ppm or less, about 200 ppm or less, or about 100 ppm or less. Thus, the method may provide a concentration of the antiscalant in the cooling water bounded by any of the aforementioned endpoints. For example, the method may provide a concentration of from about 1 ppm to about 10,000 ppm of the antiscalant in the cooling water, for example, from about 10 ppm to about 10,000 ppm, from about 50 ppm to about 10,000 ppm, from about 100 ppm to about 10,000 ppm, from about 1 ppm to about 5,000 ppm, from about 10 ppm to about 5,000 ppm, from about 50 ppm to about 5,000 ppm, from about 100 ppm to about 5,000 ppm, from about 1 ppm to about 1,000 ppm, from about 10 ppm to about 1,000 ppm, from about 50 ppm to about 1,000 ppm, from about 100 ppm to about 1,000 ppm, from about 1 ppm to about 500 ppm, from about 10 ppm to about 500 ppm, from about 50 ppm to about 500 ppm, from about 100 ppm to about 500 ppm, from about 1 ppm to about 200 ppm, from about 10 ppm to about 200 ppm, or from about 50 ppm to about 200 ppm, from about 1 ppm to about 100 ppm, from about 10 ppm to about 100 ppm, or from about 50 ppm to about 100 ppm. In some embodiments, the concentration of the antiscalant in the cooling water is from about 1 ppm to about 10,000 ppm. In some embodiments, the concentration of the antiscalant in the cooling water is from about 10 ppm to about 200 ppm. In certain embodiments, the concentration of the antiscalant in the cooling water is from about 10 ppm to about 100 ppm.

In some embodiments, the method may provide a concentration of about 1 ppm or more of the nonionic surfactant in the cooling water, for example, about 10 ppm or more, about 50 ppm or more, or about 100 ppm or more. Alternatively, or additionally, the method may provide a concentration of about 10,000 ppm or less of the nonionic surfactant in the cooling water, for example, about 5,000 ppm or less, about 1,000 ppm or less, about 500 ppm or less, about 200 ppm or less, or about 100 ppm or less. Thus, the method may provide a concentration of the nonionic surfactant in the cooling water bounded by any of the aforementioned endpoints. For example, the method may provide a concentration of from about 1 ppm to about 10,000 ppm of the nonionic surfactant in the cooling water, for example, from about 10 ppm to about 10,000 ppm, from about 50 ppm to about 10,000 ppm, from about 100 ppm to about 10,000 ppm, from about 1 ppm to about 5,000 ppm, from about 10 ppm to about 5,000 ppm, from about 50 ppm to about 5,000 ppm, from about 100 ppm to about 5,000 ppm, from about 1 ppm to about 1,000 ppm, from about 10 ppm to about 1,000 ppm, from about 50 ppm to about 1,000 ppm, from about 100 ppm to about 1,000 ppm, from about 1 ppm to about 500 ppm, from about 10 ppm to about 500 ppm, from about 50 ppm to about 500 ppm, from about 100 ppm to about 500 ppm, from about 1 ppm to about 200 ppm, from about 10 ppm to about 200 ppm, or from about 50 ppm to about 200 ppm, from about 1 ppm to about 100 ppm, from about 10 ppm to about 100 ppm, or from about 50 ppm to about 100 ppm. In some embodiments, the concentration of the nonionic surfactant in the cooling water is from about 1 ppm to about 10,000 ppm. In certain embodiments, the concentration of the nonionic surfactant in the cooling water is from about 10 ppm to about 200 ppm. In preferred embodiments, the concentration of the nonionic surfactant in the cooling water is from about 10 ppm to about 100 ppm The chelant may include any suitable compound capable of chelating (e.g., sequestering) components of the salts and/or minerals (e.g., metal ions) in the cooling system. For example, the chelant may comprise ethylenediaminetetraacetic acid (EDTA), ethyleneglycol bis(2-aminoethyl ether)-N,N,N',N' tetraacetic acid (EGTA), carboxymethyl cellulose (CMC), nitrilotriacetic acid (NTA), diethylenetriaminepentaacetic acid (DTPA), methylglycinediacetic acid, [[(2-hydroxyethyl)imino]bis(methylene)]-bisphosphonic acid, 4-(phosphonomethyl)-2-hydroxy-2-oxo-1,4,2-oxazaphosphorinane, a salt thereof, or a combination thereof.

The evaporative media may be contacted with any suitable amount of the chelant to help inhibit the formation of scale in the evaporative media. In some embodiments, the method may provide a concentration of about 1 ppm or more of the chelant in the cooling water, for example, about 10 ppm or more, about 50 ppm or more, or about 100 ppm or more. Alternatively, or additionally, the method may provide a concentration of about 10,000 ppm or less of the chelant in the cooling water, for example, about 5,000 ppm or less, about 1,000 ppm or less, about 500 ppm or less, or about 100 ppm or less. Thus, the method may provide a concentration of the chelant in the cooling water bounded by any of the aforementioned endpoints. For example, the method may provide a concentration of from about 1 ppm to about 10,000 ppm of the chelant in the cooling water, for example, from about 10 ppm to about 10,000 ppm, from about 50 ppm to about 10,000 ppm, from about 100 ppm to about 10,000 ppm, from about 1 ppm to about 5,000 ppm, from about 10 ppm to about 5,000 ppm, from about 50 ppm to about 5,000 ppm, from about 100 ppm to about 5,000 ppm, from about 1 ppm to about 1,000 ppm, from about 10 ppm to about 1,000 ppm, from about 50 ppm to about 1,000 ppm, from about 100 ppm to about 1,000 ppm, from about 1 ppm to about 500 ppm, from about 10 ppm to about 500 ppm, from about 50 ppm to about 500 ppm, from about 100 ppm to about 500 ppm, from about 1 ppm to about 100 ppm, from about 10 ppm to about 100 ppm, or from about 50 ppm to about 100 ppm. In some embodiments, the concentration of the chelant in the cooling water is from about 1 ppm to about 10,000 ppm. In certain embodiments, the concentration of the chelant in the cooling water is from about 10 ppm to about 100 ppm.

In some embodiments, the method comprises contacting the evaporative media with:

(a) 2-phosphonobutane-1,2,4-tricarboxylic acid (PBTC) and nonyl phenol ethoxylate,
(b) poly(meth)acrylic acid and ethylene oxide/propylene oxide copolymer,
(c) (meth)acrylic acid/2-acrylamido-2-methyl propane sulfonate copolymer (AA/AMPS) and nonyl phenol ethoxylate,
(d) (meth)acrylic acid/2-acrylamido-2-methyl propane sulfonate copolymer (AA/AMPS) and nonyl phenol ethoxylate and ethylene oxide/propylene oxide copolymer,
(e) polymaleic anhydride and ethylene oxide/propylene oxide copolymer,
(f) 2-propenoic acid and alpha-2-propenyl-omega-hydroxypoly(oxy-1,2-ethanediyl) copolymer and ethylene oxide/propylene oxide copolymer, or
(g) 2-propenoic acid and alpha-2-propenyl-omega-hydroxypoly(oxy-1,2-ethanediyl) copolymer, (meth)acrylic acid/2-acrylamido-2-methyl propane sulfonate copolymer (AA/AMPS), and ethylene oxide/propylene oxide copolymer.

In other embodiments, the method comprises contacting the evaporative media with:

(h) 2-phosphonobutane-1,2,4-tricarboxylic acid (PBTC), nonyl phenol ethoxylate, and ethylenediaminetetraacetic acid (EDTA),
(i) 1-hydroxyethylidene-1,1-diphosphonic acid (HEDP), nonyl phenol ethoxylate, and ethylenediaminetetraacetic acid (EDTA),
(j) (meth)acrylic acid/2-acrylamido-2-methyl propane sulfonate copolymer (AA/AMPS), nonyl phenol ethoxylate, and ethylenediaminetetraacetic acid (EDTA),
(k) (meth)acrylic acid/2-acrylamido-2-methyl propane sulfonate copolymer (AA/AMPS), ethylene oxide/propylene oxide copolymer, and ethylenediaminetetraacetic acid (EDTA), (l) poly(meth)acrylic acid, ethylene oxide/propylene oxide copolymer, and ethylenediaminetetraacetic acid (EDTA), (m) polymaleic anhydride, ethylene oxide/propylene oxide copolymer, and ethylenediaminetetraacetic acid (EDTA), (n) 2-propenoic acid and alpha-2-propenyl-omega-hydroxypoly(oxy-1,2-ethanediyl) copolymer, (meth) acrylic acid/2-acrylamido-2-methyl propane sulfonate copolymer (AA/AMPS), ethylene oxide/propylene oxide copolymer, and ethylenediaminetetraacetic acid (EDTA), (o) 2-phosphonobutane-1,2,4-tricarboxylic acid (PBTC), nonyl phenol ethoxylate, and carboxymethyl cellulose (CMC), (p) 1-hydroxyethylidene-1,1-diphosphonic acid (HEDP), nonyl phenol ethoxylate, and carboxymethyl cellulose (CMC), (q) (meth)acrylic acid/2-acrylamido-2-methyl propane sulfonate copolymer (AA/AMPS), nonyl phenol ethoxylate, and carboxymethyl cellulose (CMC), (r) (meth)acrylic acid/2-acrylamido-2-methyl propane sulfonate copolymer (AA/AMPS), ethylene oxide/propylene oxide copolymer, and carboxymethyl cellulose (CMC), (s) poly(meth)acrylic acid, ethylene oxide/propylene oxide copolymer, and carboxymethyl cellulose (CMC), (t) polymaleic anhydride, ethylene oxide/propylene oxide copolymer, and carboxymethyl cellulose (CMC), (u) 2-propenoic acid and alpha-2-propenyl-omega-hydroxypoly(oxy-1,2-ethanediyl) copolymer, (meth) acrylic acid/2-acrylamido-2-methyl propane sulfonate copolymer (AA/AMPS), ethylene oxide/propylene oxide copolymer, and carboxymethyl cellulose (CMC), (v) 2-phosphonobutane-1,2,4-tricarboxylic acid (PBTC), nonyl phenol ethoxylate, ethylenediaminetetraacetic acid (EDTA), and carboxymethyl cellulose (CMC), (w) 1-hydroxyethylidene-1,1-diphosphonic acid (HEDP), nonyl phenol ethoxylate, ethylenediaminetetraacetic acid (EDTA), and carboxymethyl cellulose (CMC), (x) (meth)acrylic acid/2-acrylamido-2-methyl propane sulfonate copolymer (AA/AMPS), nonyl phenol ethoxylate, ethylenediaminetetraacetic acid (EDTA), and carboxymethyl cellulose (CMC), (y) (meth)acrylic acid/2-acrylamido-2-methyl propane sulfonate copolymer (AA/AMPS), ethylene oxide/propylene oxide copolymer, ethylenediaminetetraacetic acid (EDTA), and carboxymethyl cellulose (CMC), (z) poly(meth)acrylic acid, ethylene oxide/propylene oxide copolymer, ethylenediaminetetraacetic acid (EDTA), and carboxymethyl cellulose (CMC), (aa) polymaleic anhydride, ethylene oxide/propylene oxide copolymer, ethylenediaminetetraacetic acid (EDTA), and carboxymethyl cellulose (CMC), or (bb) 2-propenoic acid and alpha-2-propenyl-omega-hydroxypoly(oxy-1,2-ethanediyl) copolymer, (meth) acrylic acid/2-acrylamido-2-methyl propane sulfonate copolymer (AA/AMPS), ethylenediaminetetraacetic acid (EDTA), ethylene oxide/propylene oxide copolymer, and carboxymethyl cellulose (CMC).

In certain embodiments, the method comprises contacting the evaporative media with: (a) an oxyalkylated alcohol (e.g., a $C_8$-$C_{22}$ alcohol ethoxylate such as ethoxylated tridecyl alcohol) and (b) polymaleic anhydride, hydrolyzed polymaleic acid (HPMA)), or a combination thereof. In other embodiments, the method comprises contacting the evaporative media with: (a) an oxyalkylated alcohol (e.g., a $C_8$-$C_{22}$ alcohol ethoxylate such as ethoxylated tridecyl alcohol and (b) 2-acrylamido-2-methyl-1-propanesulfonic acid, acrylic acid, a copolymer thereof, or a combination thereof.

In some embodiments, (a) the nonionic surfactant or (b) the nonionic surfactant and the antiscalant, and, the optional chelant, and any further optional components may be contacted with the porous evaporative media and/or added to the water of a cooling system in the presence of a carrier. The carrier may include any suitable component that increases the miscibility of the antiscalant, the nonionic surfactant, the optional chelant, and any further optional components. For example, the carrier may simply include water and/or may include a water-miscible co-solvent such as, for example, acetone, methanol, ethanol, propanol, formic acid, formamide, propylene glycol, ethylene glycol, or a combination thereof.

In some embodiments, the porous evaporative media is contacted with (a) a nonionic surfactant or (b) a nonionic surfactant and an antiscalant, and, optionally a chelant, before using the porous evaporative media in the water of the cooling system. In other words, the porous evaporative media may be pretreated with (a) the nonionic surfactant or (b) the nonionic surfactant and the antiscalant, and, optionally the chelant, prior to use in the cooling system. Alternatively, or additionally, the porous evaporative media may be contacted with (a) the nonionic surfactant or (b) the nonionic surfactant and the antiscalant, and, optionally the chelant, while the media is being used in the cooling system. For example, the method may include combining the water of the cooling system with (a) the nonionic surfactant or (b) the nonionic surfactant and the antiscalant, and, optionally the chelant, to produce treated water which exhibits reduced fouling due to scale formation on the porous evaporative media. The water of the cooling system may be treated with (a) the nonionic surfactant or (b) the nonionic surfactant and the antiscalant, and, optionally the chelant, sporadically, intermittently, or continuously such that the porous evaporative media is contacted with (a) the nonionic surfactant or (b) the nonionic surfactant and the antiscalant, and, optionally the chelant. In some embodiments, the method includes continuously feeding the treated water (i.e., the cooling water combined with (a) the nonionic surfactant or (b) the nonionic surfactant and the antiscalant, and, optionally the chelant) through the porous evaporative media.

Regardless of whether the porous evaporative media is contacted with (a) a nonionic surfactant or (b) a nonionic surfactant and an antiscalant, and, optionally a chelant, before or during use in the cooling system, the porous evaporative media may be contacted with (a) the nonionic surfactant or (b) the nonionic surfactant and the antiscalant, and, optionally the chelant, separately or together in combination. For example, (a) the nonionic surfactant or (b) the nonionic surfactant and the antiscalant, and, optionally the chelant, may be added to the water of the cooling system separately to produce the treated water. Alternatively, (a) the nonionic surfactant or (b) the nonionic surfactant and the antiscalant, and, optionally the chelant, may be added to the water of the cooling system together in combination to produce the treated cooling water.

In some embodiments, the methods described herein may further include adjusting the pH of the water and/or the treated water of the cooling system with a pH adjusting agent. The water and/or the treated water of the cooling system may be adjusted to any suitable pH with any suitable pH adjusting agent, e.g., to help inhibit scale formation on the porous evaporative media in the cooling system. For example, the water or treated water of the cooling system may have a pH of from about 4 to about 12. Thus, in certain preferred embodiments, the water or treated water may have a pH of from about 4 to about 12, from about 5 to about 12, from about 4 to about 11, from about 5 to about 11, from about 4 to about 10, from about 5 to about 10, from about 4 to about 9, from about 5 to about 9, from about 4 to about 8, from about 5 to about 8, from about 6 to about 12, from about 6 to about 11, from about 6 to about 10, from about 6 to about 9, from about 6 to about 8, from about 7 to about 12, from about 8 to about 12, from about 9 to about 12, from about 7 to about 10, or from about 8 to about 10. In some embodiments, the pH adjusting agent may include, e.g., sulfuric acid, acetic acid, citric acid, nitric acid, propionic acid, tartaric acid, fumaric acid, phosphoric acid, a salt thereof, or a combination thereof. In some embodiments, the antiscalant is sufficient to adjust the cooling system to the desirable pH such that a pH adjusting agent is not needed.

Thus, (a) the nonionic surfactant or (b) the nonionic surfactant and the antiscalant, and, optionally the chelant, used in the method of the invention, which is to be contacted with the porous evaporative media and/or added to cooling water of the system, may be supplied, for example, as a one-package system comprising the nonionic surfactant, the antiscalant, the optional chelant, and any further optional components. Alternatively, the scale relocating or inhibiting components of the invention may be supplied as a two-package system, three-package system, four-package system, five-package system, six-package system, or as a multi-component system with more than six packages, comprising the nonionic surfactant, the antiscalant, the optional chelant, and any further optional components as individual additives. In some embodiments, a multi-component system may allow for the adjustment of relative amounts of the nonionic surfactant, the antiscalant, the optional chelant, and any further optional components by changing the blending ratio of the components. Various methods can be employed to utilize such a multi-package system. For example, the components can pre-mixed at the point-of use, or the components can be contacted with the porous evaporative media and/or delivered to cooling water used in the system individually or together using the same mechanism of addition or using different mechanisms of addition. The components may be delivered sequentially or at the same time. As used herein, “point-of-use” refers to the point at which the components are contacted with the porous evaporative media or combined with the water of the cooling system.

The scale relocating or inhibiting components of the invention may be delivered to the point-of-use independently (e.g., such that the components are mixed together by way of their contact with the porous evaporative media and/or addition to the industrial process), or one or more of the components can be combined/mixed together before delivery to the point-of-use, e.g., shortly or immediately before delivery to the point-of-use. Application “immediately before delivery to the point-of-use” includes situations in which the components are combined about 5 minutes or less prior to being delivered in mixed form to the point-of-use, for example, about 4 minutes or less, about 3 minutes or less, about 2 minutes or less, about 1 minute or less, about 45 seconds or less, about 30 seconds or less, or about 10 seconds or less prior to being added in mixed form, or simultaneously delivering the components, at the point-of-use. Components also may be combined “immediately before the point-of-use” when the components are combined within 5 m of the point-of-use, e.g., within 1 m of the point-of-use or even within 10 cm of the point-of-use (e.g., within 1 cm of the point-of-use).

The scale relocating or inhibiting components may be contacted with the porous evaporative media and/or combined with water of the cooling system neat or as a concentrate. Alternatively, the scale relocating or inhibiting components may be diluted with an appropriate amount of water or other carrier prior to use, or diluted with the appropriate amount of water at the point-of-use (e.g., with water of the cooling system). In such an embodiment, the water treatment composition concentrate may include the scale-inhibiting components in amounts such that, upon dilution of the concentrate or neat materials with an appropriate amount of water, each component (i.e., the nonionic surfactant, the antiscalant, the optional chelant, and any further optional components) will be present (i.e., contacted with the porous evaporative media and/or combined with the water of the cooling system) in a concentration that is within the range needed for each component to serve its intended purpose. For example, the nonionic surfactant, the antiscalant, the optional chelant, and any further optional components may each be present in a concentrate in an amount that is at least about 2 times (e.g., about 3 times, about 4 times, or about 5 times) greater than the range needed for each component to serve its intended purpose so that, when the concentrate is diluted with an equal volume of water (e.g., 2 equal volumes water, 3 equal volumes of water, or 4 equal volumes of water, respectively), such that each component will be present concentration range needed for each component to serve its intended purpose.

The methods described herein may include, e.g., contacting the porous evaporative media of the cooling system (e.g., by combining the water of the cooling system) with (a) a nonionic surfactant or (b) a nonionic surfactant and an antiscalant, and, optionally a chelant, sporadically, intermittently, or continuously for any period of time. In some embodiments, the method may include contacting the porous evaporative media in the cooling system with (a) the nonionic surfactant or (b) the nonionic surfactant and the antiscalant, and, optionally the chelant, continuously for the designated period of time. In some embodiments, the method includes contacting the porous evaporative media of the cooling system with (a) the nonionic surfactant or (b) the nonionic surfactant and the antiscalant, and, optionally the chelant, continuously for a period of from about one day to about one year. For example, the porous evaporative media may be contacted with (a) the nonionic surfactant or (b) the nonionic surfactant and the antiscalant, and, optionally the chelant, continuously for a period of from about one day to about 1 year, e.g., from about one day to about 6 months, from about one day to about 3 months, from about one day to about 1 month, from about one day to about two weeks, or from about one day to about one week.

The nonionic surfactant, antiscalant, optional chelant, and any further optional components may be contacted with the porous evaporative media in the cooling system (e.g., by combining them with the water of the cooling system) by any suitable means. For example, the nonionic surfactant, the antiscalant, the optional chelant, and any further optional components may be contacted with the porous evaporative media by immersion, spraying, or other coating techniques. In other embodiments, the nonionic surfactant, antiscalant, optional chelant, and any further optional components or a solution thereof may be contacted with the porous evaporative media by being introduced into the water of the cooling system by any conventional method and, if desired, may be fed into the cooling system on either a periodic or continuous basis.

As used herein, "water" refers to any substance that includes water as a primary ingredient. Water may include, for example, purified water, tap water, fresh water, recycled water, brine, steam, and/or any aqueous solution, or aqueous blend.

As used herein, "cooling system" means any system that utilizes a porous media as a means for water evaporation as part of an industrially applicable process. Non-limiting examples of cooling systems include adiabatic cooling systems, evaporative cooling systems, humidification systems, or any other systems that utilize water evaporation as part of an industrially applicable process. In some embodiments, the cooling system may include an industrial cooling system used in a data center, an automotive application, an industrial application, a commercial application, or an agricultural application.

In certain embodiments, the methods described herein are utilized in the relocation and/or inhibition of scale formation on a porous evaporative media used in adiabatic cooling systems. For example, data centers generate significant heat, which may affect not only the efficiency, but also the very operation, of data centers. Adiabatic (or evaporative) cooling systems provide an effective way to remove the significant heat load generated by a data center. Evaporative cooling system generally draw heated air through porous evaporative media. A hyperscale facility may include dozens of data halls and each data hall may include dozens of adiabatic cooling units that contain several porous evaporative media pads. As water evaporates from the pads, the surrounding air is cooled. The cooled air is pushed or drawn out of the adiabatic cooling system to the warmer environment. This process may be impeded by the formation of scale within the porous evaporative media. Thus, the methods described herein may serve to improve the efficiency of porous evaporative media in adiabatic (or evaporative) cooling systems, particularly in industrial data centers.

The method described herein improves the evaporative performance of the porous evaporative media. For example, the method can increase the longevity of the porous evaporative media, increase the saturation efficiency of the porous evaporative media, increase the humidity of the cooling system, decrease the temperature of the cooling system, or a combination thereof, of a porous evaporative media relative to a porous evaporative media that has not been contacted with (a) the nonionic surfactant or (b) the nonionic surfactant and the antiscalant, and, optionally the chelant.

ASPECTS OF THE DISCLOSURE

Aspects, including embodiments, of the invention described herein may be beneficial alone or in combination, with one or more other aspects or embodiments. Without limiting the foregoing description, certain non-limiting aspects of the disclosure numbered 1-38 are provided below. As will be apparent to those of skill in the art upon reading this disclosure, each of the individually numbered aspects may be used or combined with any of the preceding or following individually numbered aspects. This is intended to provide support for all such combinations of aspects and is not limited to combinations of aspects explicitly provided below:

(1) In aspect (1) is presented a method of improving an evaporative performance of a porous evaporative media in a cooling system that utilizes water evaporation for heat transfer, the method comprising contacting the porous evaporative media with a scale relocating-effective amount of a nonionic surfactant, optionally in combination with an antiscalant.

(2) In aspect (2) is presented the method of aspect (1), wherein the method comprises contacting the porous evaporative media with a scale relocating-effective amount of the nonionic surfactant and substantially no antiscalant.

(3) In aspect (3) is presented the method of aspect (1), wherein the method comprises contacting the porous evaporative media with a scale relocating-effective amount of the nonionic surfactant and no antiscalant.

(4) In aspect (4) is presented the method of aspect (1), wherein the method comprises contacting the porous evaporative media with the scale relocating-effective amount of the nonionic surfactant and an antiscalant.

(5) In aspect (5) is presented the method of aspect (1), wherein the method comprises contacting the porous evaporative media with a scale relocating-effective amount of the nonionic surfactant and a scale inhibiting-effective amount of an antiscalant.

(6) In aspect (6) is presented the method of any one of aspects (1), (4), and (5), wherein the antiscalant comprises an organophosphorus compound.

(7) In aspect (7) is presented the method of aspect (6), wherein the organophosphorus compound comprises an organophosphonic acid, an organophosphinic acid, a salt thereof, or a combination thereof.

(8) In aspect (8) is presented the method of any one of aspects (1) and (4)-(7), wherein the antiscalant comprises aminotrismethylenephosphonic acid (AMP), 1-hydroxyethylidene-1,1-diphosphonic acid (HEDP), 2-phosphonobutane-1,2,4-tricarboxylic acid (PBTC), polyamino polyether methylene phosphonate (PAPEMP), ethylenediamine tetramethylene phosphonic acid (EDTMPA), diethylenetriamine pentamethylene phosphonic acid (DTPMPA), hexamethylenediamine tetramethylene phosphonic acid (HMDTMPA), bis(hexamethylenetriamine pentamethylene phosphonic acid) (BHMTPMP), hydroxyethylamino di(methylene phosphonic acid) (HEMPA) hydroxyphosphonoacetic acid (HPA), phosphine succinic oligomer (PSO), a salt thereof, or a combination thereof.

(9) In aspect (9) is presented the method of any one of aspects (1) and (4)-(8), wherein the antiscalant comprises polymaleic anhydride, poly(meth)acrylic acid, poly(meth)acrylamide, polyaspartic acid (pAsp), polysulfonic acid, adipic acid, a vinyl dicarboxylic acid, an alkyl epoxy carboxylate, a salt thereof, or a combination thereof.

(10) In aspect (10) is presented the method of any one of aspects (1) and (4)-(9,) wherein the antiscalant comprises a copolymer comprising a monomer selected from (meth)acrylic acid, (meth)acrylamide, hydroxypropylacrylate, 2-acrylamido-2-methyl propane sulfonate, maleic anhydride, sulfonated styrene, tertiary butyl acrylamide, a salt thereof, or a combination thereof.

(11) In aspect (11) is presented the method of any one of aspects (1) and (4)-(10), wherein the antiscalant comprises a (meth)acrylic acid/(meth)acrylamide copolymer (AA/AM), a (meth)acrylic acid/hydroxypropylacrylate copolymer (AA/HPA), a (meth)acrylic acid/2-acrylamido-2-methyl propane sulfonate copolymer (AA/AMPS), a maleic anhydride/sulfonated styrene copolymer (MA/SS), a (meth)acrylic acid/(meth)acrylamide/tertiary butyl acrylamide copolymer (AA/AM/t-BAM), a (meth)acrylic acid/2-acrylamido-2-methyl propane sulfonate/tertiary butyl acrylamide copolymer (AA/AMPS/t-BAM), a (meth)acrylic acid/sulfonated styrene/2-acrylamido-2-methyl propane sulfonate copolymer (AA/SS/AMPS), a (meth)acrylic acid/

(meth)acrylamide/aminomethyl sulfonate copolymer (AA/AM/AMS), a 2-propenoic acid and alpha-2-propenyl-omega-hydroxypoly(oxy-1,2-ethanediyl) copolymer, a salt thereof, or a combination thereof.

(12) In aspect (12) is presented the method of any one of aspects (1)-(11), wherein the nonionic surfactant comprises polyethylene oxide, polypropylene oxide, polyethylene oxide/polypropylene oxide, or a combination thereof.

(13) In aspect (13) is presented the method of any one of aspects (1)-(12), wherein the nonionic surfactant comprises a $C_8$-$C_{22}$ alcohol ethoxylate, a $C_8$-$C_{22}$ ethoxylate, a $C_8$-$C_{22}$ alkyl phenol ethoxylate, a terminally blocked $C_8$-$C_{22}$ alcohol polyethylene glycol ether, a monododecyl ether, a nonoxynol, an ethoxylated $C_8$-$C_{22}$ ester, an ethoxylated amine, a $C_8$-$C_{22}$ amide, a polyethoxylated tallow amine, a poloxamer, a $C_8$-$C_{22}$ ester of a polyhydroxy compound, an alkyl polyglucoside, myristamine oxide, or a combination thereof.

(14) In aspect (14) is presented the method of any one of aspects (1)-(13), wherein the nonionic surfactant comprises a polyethylene oxide polymer, a polypropylene polymer, a polyethylene oxide/polypropylene oxide copolymer, octaethylene glycol monododecyl ether, pentaethylene glycol monododecyl ether, Triton X-100, cocamide monoethanolamine, cocamide diethanolamine, glycerol monostearate, glycerol monolaurate, sorbitan monolaurate, sorbitan monostearate, sorbitan tristearate, Tween 20, Tween 40, Tween 60, Tween 80, decyl glucoside, lauryl glucoside, octyl glucoside, or a combination thereof.

(15) In aspect (15) is presented the method of any one of aspects (1)-(14), further comprising contacting the porous evaporative media with a chelant.

(16) In aspect (16) is presented the method of aspect (15), wherein the chelant comprises ethylenediaminetetraacetic acid (EDTA), ethyleneglycol bis(2-aminoethyl ether)-N,N,N',N' tetraacetic acid (EGTA), carboxymethyl cellulose (CMC), nitrilotriacetic acid (NTA), diethylenetriaminepentaacetic acid (DTPA), methylglycinediacetic acid, [[(2-hydroxyethyl)imino]bis(methylene)]-bisphosphonic acid, 4-(phosphonomethyl)-2-hydroxy-2-oxo-1,4,2-oxazaphosphorinane, a salt thereof, or a combination thereof.

(17) In aspect (17) is presented the method of any one of aspects (1)-(16), comprising contacting the porous evaporative media with (a) the nonionic surfactant or (b) the nonionic surfactant and an antiscalant, and, optionally a chelant, before using the porous evaporative media in the cooling system.

(18) In aspect (18) is presented the method of aspect (17), comprising contacting the porous evaporative media with (a) the nonionic surfactant or (b) the nonionic surfactant and an antiscalant, and, optionally a chelant, separately.

(19) In aspect (19) is presented the method of aspect (17), comprising contacting the porous evaporative media with (a) the nonionic surfactant or (b) the nonionic surfactant and an antiscalant, and, optionally a chelant, together in combination.

(20) In aspect (20) is presented the method of any one of aspects (1)-(19), comprising contacting the porous evaporative media with (a) the nonionic surfactant or (b) the nonionic surfactant and an antiscalant, and, optionally a chelant, while the porous evaporative media is being used in the cooling system.

(21) In aspect (21) is presented the method of aspect (20), comprising combining the water of the cooling system with (a) the nonionic surfactant or (b) the nonionic surfactant and an antiscalant, and, optionally a chelant, to produce a treated cooling water for inhibiting scale formation on the porous evaporative media.

(22) In aspect (22) is presented the method of aspect (21), comprising continuously feeding the treated cooling water through the porous evaporative media.

(23) In aspect (23) is presented the method of aspect (21) or (22), comprising combining (a) the nonionic surfactant or (b) the nonionic surfactant and the antiscalant, and, optionally the chelant, separately to produce the treated cooling water.

(24) In aspect (24) is presented the method of aspect (21) or (22), comprising combining (a) the nonionic surfactant or (b) the nonionic surfactant and an antiscalant, and, optionally a chelant, together in combination to produce the treated cooling water.

(25) In aspect (25) is presented the method of any one of aspects (21)-(24), further comprising adjusting the pH of the treated cooling water with a pH adjusting agent.

(26) In aspect (26) is presented the method of aspect (25), wherein the pH adjusting agent comprises sulfuric acid, acetic acid, citric acid, nitric acid, propionic acid, tartaric acid, fumaric acid, phosphoric acid, salts thereof, or a combination thereof.

(27) In aspect (27) is presented the method of any one of aspects (21)-(26), wherein the concentration of the antiscalant in the treated cooling water is from about 1 ppm to about 10,000 ppm.

(28) In aspect (28) is presented the method of aspect (27), wherein the concentration of the antiscalant in the treated cooling water is from about 10 ppm to about 100 ppm.

(29) In aspect (29) is presented the method of any one of aspects (21)-(28), wherein the concentration of the nonionic surfactant in the treated cooling water is from about 1 ppm to about 10,000 ppm.

(30) In aspect (30) is presented the method of aspect (29), wherein the concentration of the nonionic surfactant in the treated cooling water is from about 10 ppm to about 200 ppm.

(31) In aspect (31) is presented the method of any one of aspects (1)-(30), comprising contacting the porous evaporative media in the cooling system with (a) the nonionic surfactant or (b) the nonionic surfactant and an antiscalant, and, optionally a chelant, continuously for a period of from about one day to about one year.

(32) In aspect (32) is presented the method of aspect (31), comprising contacting the porous evaporative media in the cooling system with (a) the nonionic surfactant or (b) the nonionic surfactant and an antiscalant, and, optionally a chelant, continuously for a period of from about one day to about three months.

(33) In aspect (33) is presented the method of aspect (32), comprising contacting the porous evaporative media in the cooling system with (a) the nonionic surfactant or (b) the nonionic surfactant and an antiscalant, and, optionally a chelant, continuously for a period of from about one day to about one month.

(34) In aspect (34) is presented the method of any one of aspects (1)-(33), wherein the cooling system comprises an adiabatic cooling system, an evaporative cooling system, or a humidification system.

(35) In aspect (35) is presented the method of any one of aspects (1)-(34), wherein the cooling system is used in a data center, an automotive application, an industrial application, a commercial application, or an agricultural application.

(36) In aspect (36) is presented the method of any one of aspects (1)-(35), wherein the porous evaporative media comprises one or more corrugated sheets.

(37) In aspect (37) is presented the method of any one of aspects (1)-(36), wherein the corrugated sheet comprise a fibrous material, a filler, a polymer binder, or a combination thereof.

(38) In aspect (38) is presented the method of any one of aspects (1)-(37), wherein improving evaporative performance of the porous evaporative media includes increasing the longevity of the porous evaporative media, increases the saturation efficiency of the porous evaporative media, increases the humidity of the cooling system, decreases the temperature of the cooling system, or a combination thereof.

EXAMPLES

The following examples further illustrate the invention but, of course, should not be construed as in any way limiting its scope.

Example 1

This example demonstrates the beneficial scale formation (calcium) inhibition performance of an exemplary method.

A lab scale adiabatic cooling/humidification unit, as depicted in FIG. 1, was built and used to test the ability of an antiscalant and a nonionic surfactant to inhibit the formation of scale (calcium) in the porous evaporative media. The lab scale adiabatic cooling/humidification unit had a porous evaporative media holder, a sump, water recirculation system (pump, pipe and, spray nozzle), air flowing system (fan and air conduit), makeup water, and blow down control. The water flow and airflow was adjustable to mimic the industrial water system of interest.

The water of the lab scale adiabatic cooling/humidification unit had a calcium concentration of 200 ppm and was treated with an antiscalant (e.g., a copolymer of 2-acrylamido-2-methyl-1-propanesulfonic acid and acrylic acid (poly(AA/AMPS)) or 2-phosphonobutane-1,2,4-tricarboxylic acid (PBTC)) and/or a nonionic surfactant (e.g., an ethylene oxide/propylene oxide copolymer (EO/PO)) to achieve the active level concentrations set forth in Table 1. The lab scale adiabatic cooling/humidification unit was operated at 4-8 cycles of concentration, and the scale inhibition rate was determined by the following formula:

$$\text{Scale inhibition rate} = \frac{W'_f - W'_i}{W_f - W_i} \times 100\%,$$

where $W'_f$=initial weight of evaporative media sample after testing when treatment is applied, $W'_i$=initial weight of evaporative media sample before testing when treatment is applied, $W_i$=initial weight of evaporative media sample after testing when treatment is not applied, and $W_f$=Initial weight of evaporative media sample before testing when treatment is not applied. The results are set forth in Table 1.

TABLE 1

Calcium Scale Formation Inhibition

| Formulation | Antiscalant (ppm) | Nonionic Surfactant (ppm) | Calcium Scale Inhibition |
|---|---|---|---|
| Comparative Formulation 1A | poly(AA/AMPS) (10 ppm) | none | 22% |
| Inventive Formulation 1B | poly(AA/AMPS) (10 ppm) | EO/PO (10 ppm) | 65% |
| Inventive Formulation 1C | PBTC (10 ppm) | EO/PO (10 ppm) | 46% |

As is apparent from the results set forth in Table 1, Inventive Formulations 1B and 1C, containing both an antiscalant and a nonionic surfactant significantly outperformed Comparative Formulation 1A, containing an antiscalant only. More particularly, Inventive Formulation 1B, containing poly(AA/AMPS) and EO/PO, inhibited scale (calcium) formation approximately three times more effectively than Comparative Formulation 1A, containing poly (AA/AMPS). Similarly, Inventive Formulation 1C, containing PBTC and EO/PO, inhibited scale (calcium) formation approximately two times more effectively than Comparative Formulation 1A, containing poly(AA/AMPS).

Example 2

This example demonstrates the beneficial scale formation (silica) inhibition performance of an exemplary method.

A lab scale adiabatic cooling/humidification unit, as depicted in FIG. 1, was built and used to test the ability of an antiscalant and a nonionic surfactant to inhibit the formation of scale (silica) in the porous evaporative media. The lab scale adiabatic cooling/humidification unit had a porous evaporative media holder, a sump, water recirculation system (pump, pipe and, spray nozzle), air flowing system (fan and air conduit), makeup water, and blow down control. The water flow and airflow was adjustable to mimic the industrial water system of interest.

The water of the lab scale adiabatic cooling/humidification unit had a silica concentration of 100 ppm and was treated with an antiscalant (e.g., a copolymer of 2-acrylamido-2-methyl-1-propanesulfonic acid and acrylic acid (poly(AA/AMPS)) and/or a 2-propenoic acid and alpha-2-propenyl-omega-hydroxypoly(oxy-1,2-ethanediyl) copolymer (PAP/PHXOED-Na)) and/or a nonionic surfactant (e.g., an ethylene oxide/propylene oxide copolymer (EO/PO)) to achieve the active level concentrations set forth in Table 2. The lab scale adiabatic cooling/humidification unit was operated at 4-8 cycles of concentration, and the scale inhibition rate was determined by the following formula:

$$\text{Scale inhibition rate} = \frac{W'_f - W'_i}{W_f - W_i} \times 100\%,$$

where $W'_f$=initial weight of evaporative media sample after testing when treatment is applied, $W'_i$=initial weight of evaporative media sample before testing when treatment is applied, $W_i$=initial weight of evaporative media sample after testing when treatment is not applied, and $W_f$=Initial weight of evaporative media sample before testing when treatment is not applied. The results are set forth in Table 2.

TABLE 2

| Silica Scale Formation Inhibition | | | |
|---|---|---|---|
| Formulation | Antiscalant (ppm) | Nonionic Surfactant (ppm) | Silica Scale Inhibition |
| Comparative Formulation 2A | PAP/PHXOED-Na (40 ppm) | none | 16% |
| Inventive Formulation 2B | PAP/PHXOED-Na (40 ppm) | EO/PO (10 ppm) | 24% |
| Inventive Formulation 2C | PAP/PHXOED-Na (40 ppm) poly(AA/AMPS) (10 ppm) | EO/PO (10 ppm) | 22% |

As is apparent from the results set forth in Table 2, Inventive Formulations 2B and 2C, containing both an antiscalant and a nonionic surfactant significantly outperformed Comparative Formulation 2A, containing an antiscalant only. More particularly, Inventive Formulation 2B, containing PAP/PHXOED-Na and EO/PO, inhibited scale (silica) formation more effectively than Comparative Formulation 2A, containing PAP/PHXOED-Na. Similarly, Inventive Formulation 2C, containing PAP/PHXOED-Na, poly(AA/AMPS), and EO/PO, inhibited scale (silica) formation more effectively than Comparative Formulation 2A, containing PAP/PHXOED-Na.

Example 3

This example provides the scale weight gain (%) exhibited by porous media of a lab scale adiabatic cooling/humidification unit treated with an antiscalant and/or a nonionic surfactant.

A lab scale adiabatic cooling/humidification unit, as depicted in FIG. 1, was built and used to test the ability of an antiscalant and/or a nonionic surfactant to inhibit the formation of scale in the porous evaporative media. The lab scale adiabatic cooling/humidification unit had a porous evaporative media holder, a sump, water recirculation system (pump, pipe and, spray nozzle), air flowing system (fan and air conduit), makeup water, and blow down control. The water flow and airflow was adjustable to mimic the industrial water system of interest.

The water of the lab scale adiabatic cooling/humidification unit had a calcium concentration of 600 ppm and was treated with an antiscalant and/or a nonionic surfactant to achieve the active level concentrations set forth in Table 3. The lab scale adiabatic cooling/humidification unit was operated for 14 days, and the scale weight gain (%) was measured at the end of the 14 days. The results are set forth in Table 3.

TABLE 3

| Scale Weight Gain (%) | | |
|---|---|---|
| Antiscalant (ppm) | Nonionic Surfactant (ppm) | Scale Weight Gain (%) |
| copolymer of 2-acrylamido-2-methyl-1-propanesulfonic acid and acrylic acid (poly(AA/AMPS)) (200) | | 8 |
| copolymer of 2-acrylamido-2-methyl-1-propanesulfonic acid and acrylic acid (poly(AA/AMPS)) (100) | | 9 |
| copolymer of acrylic acid, sulfonic acid and sulfonated styrene (200) | | 8 |
| polyacrylic acid (poly(AA)) (200) | — | 17 |
| copolymer of acrylic acid, vinyl dicarboxylic acid, sulfonic acid and nonionic monomer (200) | — | 10 |
| polyaspartic acid (pASP) (200) | — | 14 |
| hydrolyzed polymaleic acid (HPMA) (200) | — | 11 |
| polymethacrylic acid (PMAA) (200) | — | 14 |
| polymaleic anhydride (PMA) (200) | — | 8 |
| 2-phosphonobutane-1,2,4,-tricarboxylic acid (PBTC) (200) | — | 8 |
| polyamino polyether methylene phosphonate (PAPEMP) (200) | — | 8 |
| phosphinosuccinic oligomer (PSO) (200) | — | 10 |
| polysulfonic acid (200) | — | 68 |
| epichlorohydrin dimethylamine (EPI/DMA) (200) | — | 81 |
| polyDADMAC (200) | — | 89 |
| trisodium salt of methylglycinediacetic acid (200)* | — | 62 |
| tetrasodium salt of ethylenediaminetetraacetic acid (Na4EDTA) (200)* | — | 53 |
| [[(2-hydroxyethyl)imino]bis(methylene)]-bisphosphonic acid and 4-(phosphonomethyl)-2-hydroxy-2-oxo-1,4,2-oxazaphosphorinane (200)* | — | 50 |
| — | oxyalkylated alcohol (200) | 40 |
| — | nonionic ethoxylated fatty acid (200) | 44 |

TABLE 3-continued

| Scale Weight Gain (%) | | |
|---|---|---|
| Antiscalant (ppm) | Nonionic Surfactant (ppm) | Scale Weight Gain (%) |
| — | ethoxylated castor oil (200) | 63 |
| — | myristamine oxide (200) | 36 |
| sulfonated acrylic acid polymer (200) | oxyalkylated alcohol (200) | 7 |
| polymaleic anhydride (PMA) (200) | oxyalkylated alcohol (200) | 10 |

*Designates a chelant

As is apparent from the results set forth in Table 3, antiscalants were more effective than surfactants at reducing the scale weight gain (%). In addition, among the antiscalants, polycarboxylic acids and organic phosphonates were most effective at reducing the scale weight gain (%). Furthermore, combining an antiscalant and a surfactant did not inhibit ability of the antiscalants to reduce the scale weight gain (%).

Example 4

This example provides the scale inhibition results of a jar test performed using a fiberglass-based porous media.

A fiberglass-based porous media was submerged in an aqueous solution containing silica, magnesium, and calcium in a jar (5 L) for four days. At time zero, the jars were treated with nothing (blank), polyalkyleneoxide terpolymer (0.1 g/L), and diethylenetriamine-adipic acid copolymer (0.1 g/L). After four days, the fiberglass-based porous media was removed from the jar, dried, and the scale weight gain (%) was measured. In addition, the fiberglass-porous media was qualitatively assessed for scale formation. The results are set forth in FIGS. 2A-2C and Table 4.

TABLE 4

| Fiberglass-based Porous Media Scale Formation | | | |
|---|---|---|---|
| | blank (FIG. 2A) | polyalkyleneoxide terpolymer (FIG. 2B) | diethylenetriamine - adipic acid copolymer (FIG. 2C) |
| Initial pH | 8.05 | 7.53 | 8.35 |
| Final pH | 8.54 | 8.51 | 8.66 |
| Initial $SiO_2$ | 188 | 188 | 188 |
| Final $SiO_2$ | 142 | 170 | 414 |
| Initial Mg | 48 | 48 | 48 |
| Final Mg | 140 | 131 | 121 |
| Initial Ca | 80 | 80 | 80 |
| Initial weight | 7.15 | 6.66 | 6.15 |
| Final weight | 7.27 | 6.70 | 6.46 |
| Weight gain (%) | 1.7 | 0.6 | 5 |
| Qualitative | No visible scale | Light scale on surface | Visible scale formation on surface |

Figure 2A:
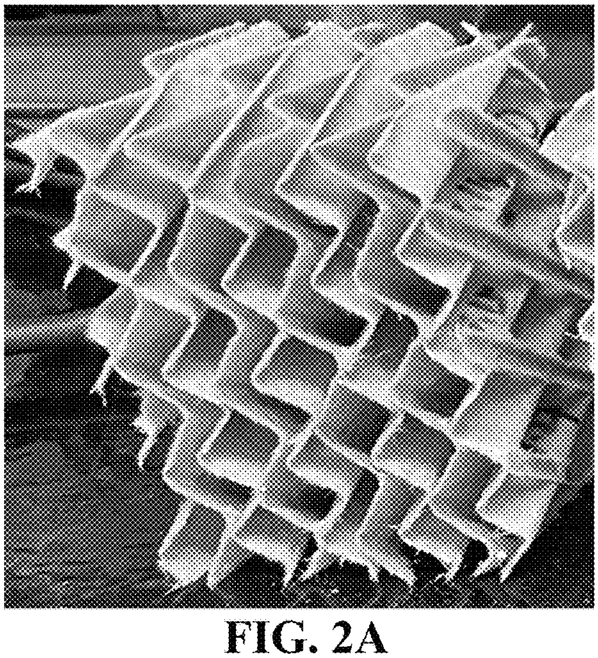
FIGS. 2A-2C depict the scale inhibition results of a jar test performed using a fiberglass-based porous media treated with a nonionic surfactant and/or an antiscalant, as described in Example 4.
Figure 2B:
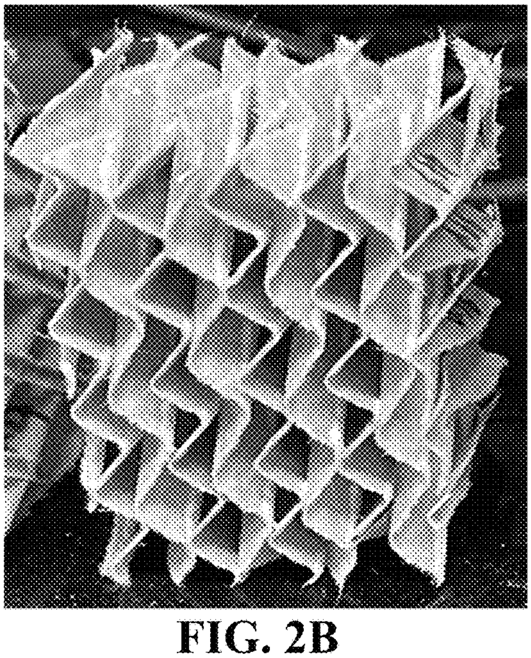
Figure 2C:
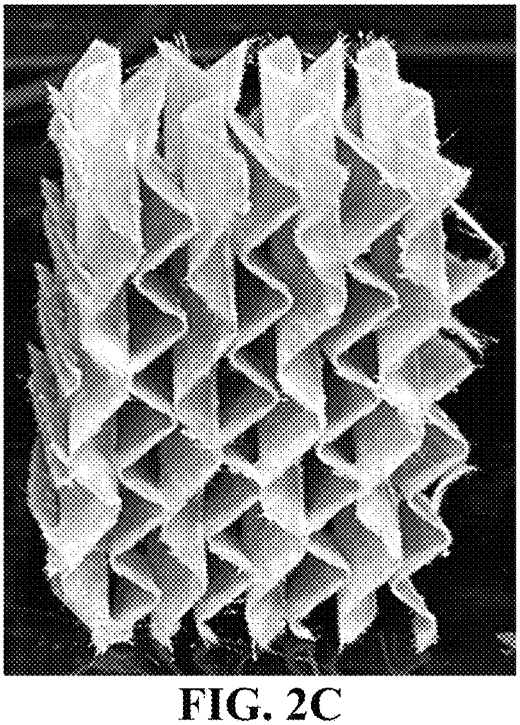
Figure 3A:
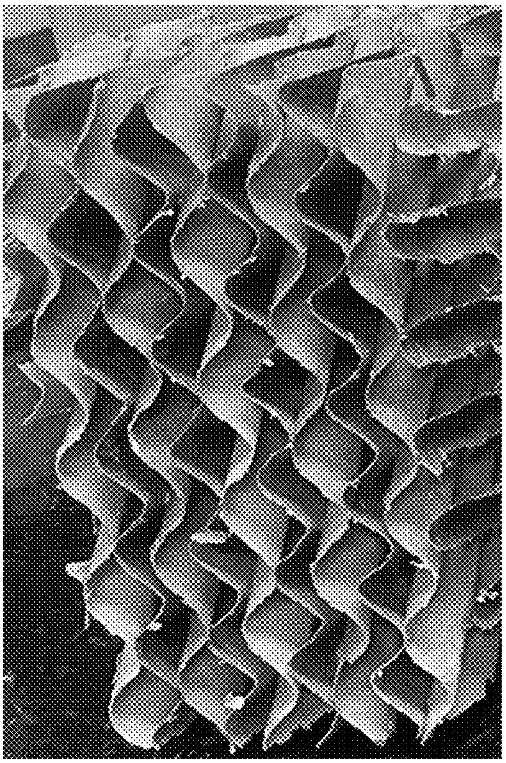
FIGS. 3A-3D depict the scale inhibition results of a jar test performed using a cellulose-based porous media treated with a nonionic surfactant and/or an antiscalant, as described in Example 5.
Figure 3B:
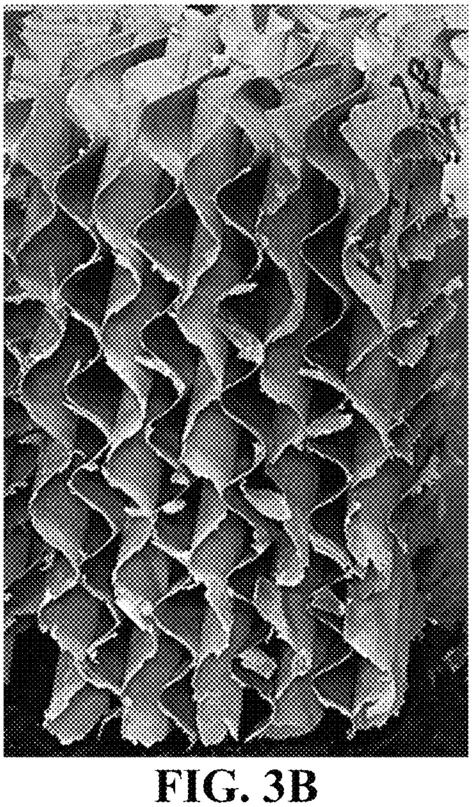
Figure 3C:
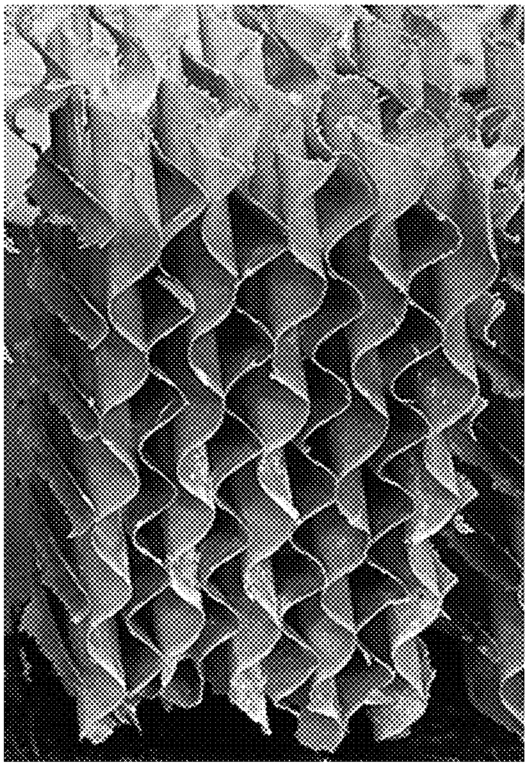
Figure 3D:
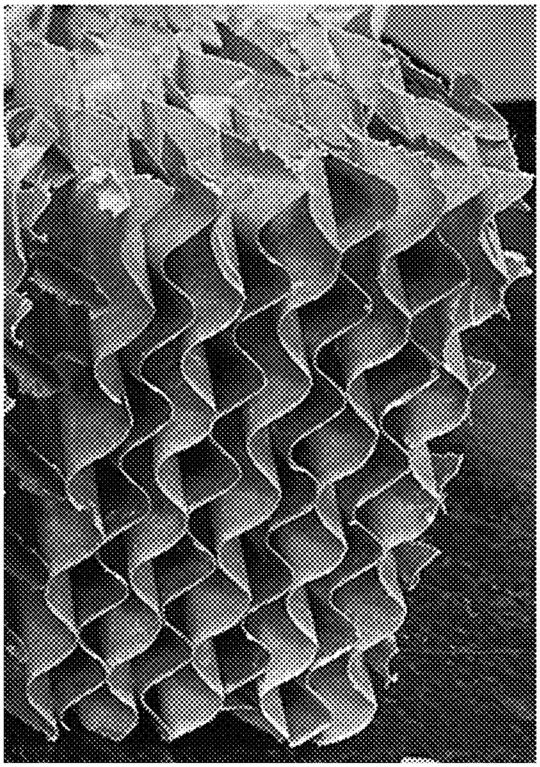

As is apparent from the results set forth in FIGS. 2A-2C and Table 4, the addition of polyalkyleneoxide terpolymer effectively reduced the weight gained from calcium scale compared to the blank sample without scale inhibitor treatment. Additionally, diethylenetriamine-adipic acid copolymer did not reduce weight gain relative to the blank sample without scale inhibitor treatment. Finally, FIGS. 2A-2C and Table 4 demonstrate that visual scale is not indicative of the true amount of scale formation within the porous evaporative media, as evidenced by the blank sample having a 1.7% weight increase without visible scale, whereas diethylenetriamine—adipic acid copolymer had a 5% weight increase with clear signs of visible scale on the surface of the porous evaporative media.

Example 5

This example provides the scale inhibition results of a jar test performed using cellulose-based porous media.

A cellulose-based porous media was submerged in an aqueous solution containing silica and magnesium in a jar (5 L) for four days. At time zero, the jars were treated with nothing (blank), polyalkyleneoxide terpolymer (0.1 g/L), diethylenetriamine-adipic acid copolymer (0.1 g/L), and allylic alcohol ethoxylate (0.1 g/L). After four days, the cellulose-based media was removed from the jar, dried, and the scale weight gain (%) was measured. In addition, the cellulose-based porous media was qualitatively assessed for scale formation. The results are set forth in FIGS. 3A-3D and Table 5.

TABLE 5

| Cellulose-based Media Scale Formation | | | | |
|---|---|---|---|---|
| | blank (FIG. 3A) | polyalkyleneoxide terpolymer (FIG. 3B) | diethylenetriamine - adipic acid copolymer (FIG. 3C) | allylic alcohol ethoxylate (FIG. 3D) |
| Initial pH | 8.02 | 7.56 | 8.25 | 7.98 |
| Final pH | 8.49 | 8.61 | 8.66 | 8.34 |
| Initial $SiO_2$ | 200 | 200 | 200 | 200 |
| Final $SiO_2$ | 170 | 210 | 299 | 191 |
| Initial Mg | 247 | 172 | 221 | 173 |
| Initial weight | 15.24 | 15.47 | 15.78 | 14.47 |
| Final weight | 17.61 | 17.90 | 17.96 | 18.24 |
| Weight gain (%) | 16% | 16% | 14% | 26% |
| Qualitative | No visible scale | Light scale on surface | Visible scale formation on surface | Light scale on surface |

As is apparent from the results set forth in FIGS. 3A-3D and Table 5, the addition of diethylenetriamine-adipic acid copolymer moderately reduced the weight gained from silica scale compared to the blank sample without scale inhibitor treatment. Additionally, allylic alcohol ethoxylate did not reduce weight gain relative to the blank sample without scale inhibitor treatment. Finally, FIGS. 3A-3D and Table 5 demonstrate that visual scale is not indicative of the true amount of scale formation within the porous evaporative media, as evidenced by the blank sample having a 16% weight increase without visible scale, whereas diethylenetriamine-adipic acid copolymer had a 14% weight increase with clear signs of visible scale on the surface of the porous evaporative media.

Example 6

This example demonstrates the beneficial scale formation inhibition exhibited by porous evaporative media treated with (i) a nonionic surfactant or (ii) an antiscalant and a nonionic surfactant.

An industrial scale adiabatic cooling/humidification unit was used to test the ability of (i) a nonionic surfactant or (ii) an antiscalant and a nonionic surfactant to inhibit the formation of scale in the porous evaporative media. The industrial scale adiabatic cooling/humidification unit had a porous evaporative media holder, a sump, water recirculation system (pump, pipe and, spray nozzle), air flowing system (fan and air conduit), makeup water, and blow down control. The water flow and airflow was adjustable to mimic the industrial water system of interest.

In particular, city water with approximately 600 ppm calcium and a conductance of 2500 μS was treated with no chemistry (baseline), oxyalkylated alcohol (i.e., a nonionic surfactant) (100 ppm), and the combination of oxyalkylated alcohol (i.e., a nonionic surfactant) (100 ppm) and copolymer of 2-acrylamido-2-methyl-1-propanesulfonic acid and acrylic acid (poly(AA/AMPS)) (i.e., an antiscalant) (100 ppm), and was cycled through the industrial scale adiabatic cooling/humidification unit for three months.

Figure 4:
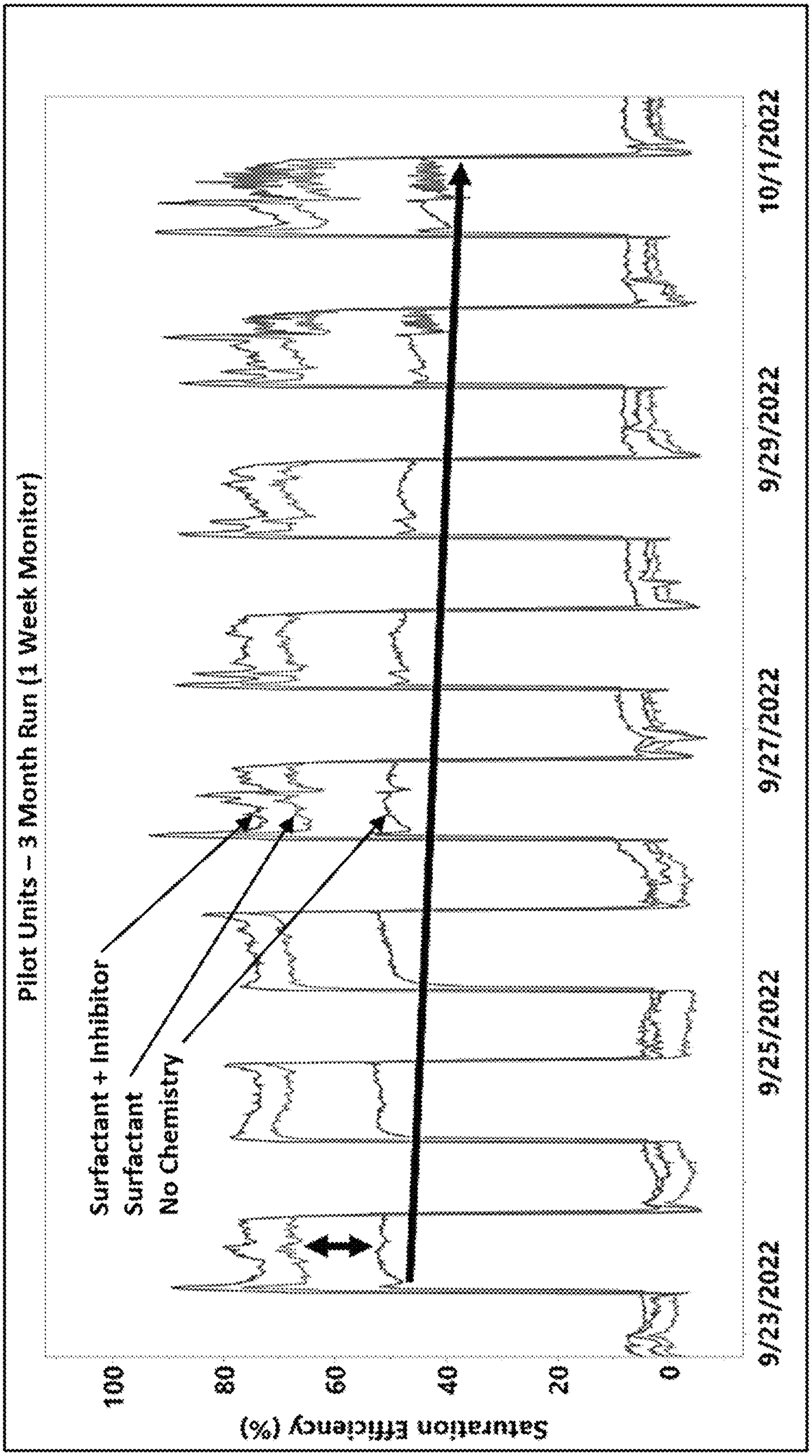
FIG. 4 shows the saturation efficiency (%) results of an industrial scale adiabatic cooling/humidification unit treated with a nonionic surfactant and/or an inhibitor (i.e., antiscalant), which was monitored over a period of a week after a 3 month trial run, as described in Example 6.

After three months, the industrial scale adiabatic cooling/humidification unit was monitored for saturation efficiency over a period of a week and the results are set forth in FIG. 4. As is apparent from the results set forth in FIG. 4, treating with the nonionic surfactant or the combination of the nonionic surfactant and the antiscalant significantly outperformed the baseline in saturation efficiency. In addition, FIG. 4 shows that the baseline saturation efficiency decreases over the course of a week. However, the systems treated with the nonionic surfactant or the combination of the nonionic surfactant and the antiscalant maintained a relatively stable saturation efficiency throughout the duration of the experiment.

Figure 6C:
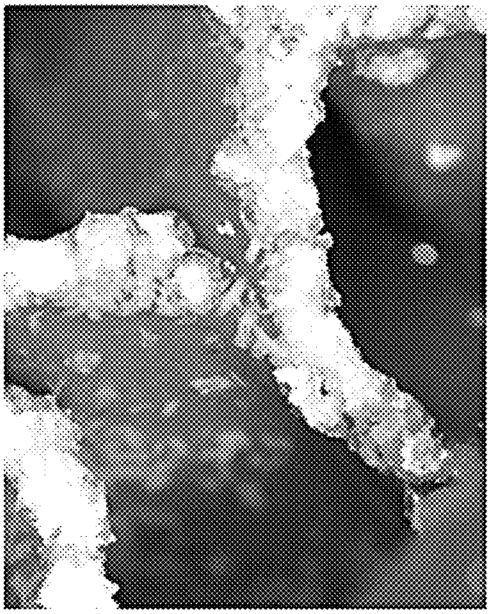
FIGS. 6A-6C show the qualitative assessment of an industrial scale adiabatic cooling/humidification unit treated with a nonionic surfactant, as described in Example 6.
Figure 6B:
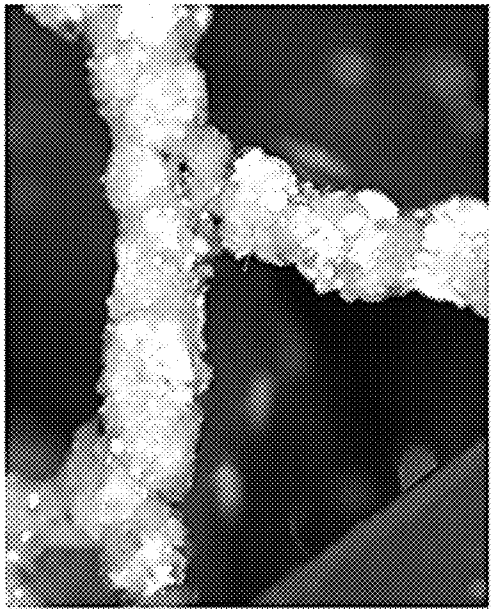
Figure 6A:
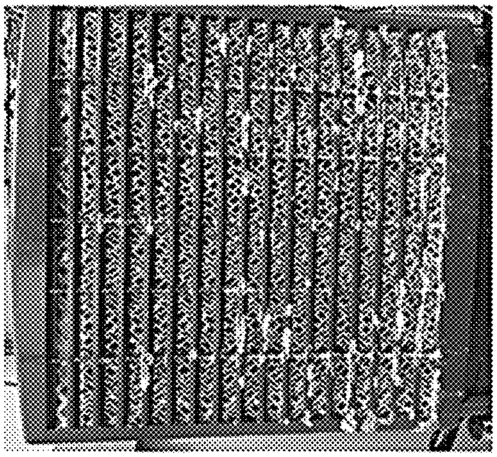
Figure 7C:
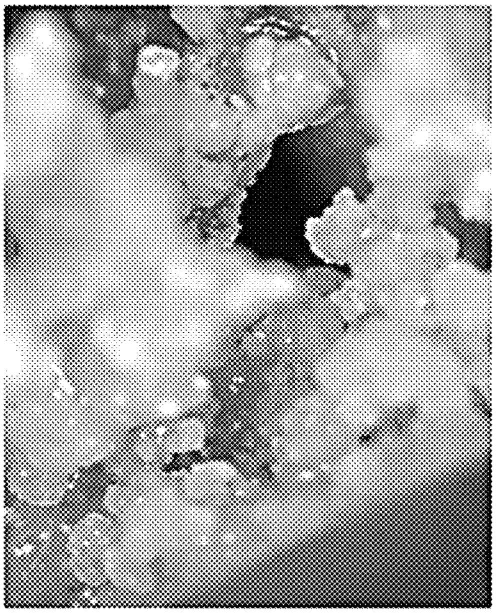
FIGS. 7A-7C show the qualitative assessment of an industrial scale adiabatic cooling/humidification unit treated with a nonionic surfactant and an antiscalant, as described in Example 6.
Figure 7B:
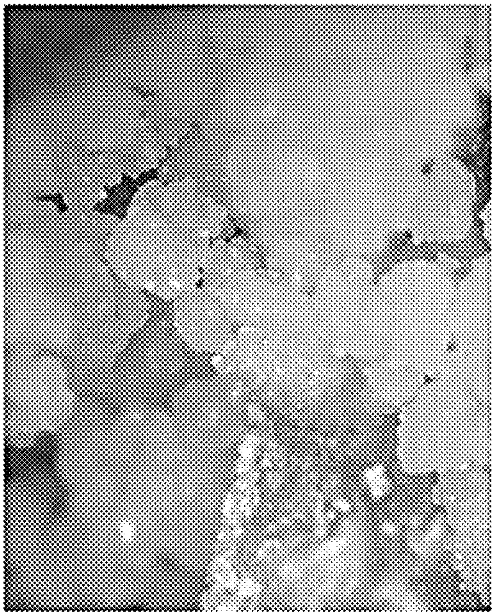
Figure 7A:
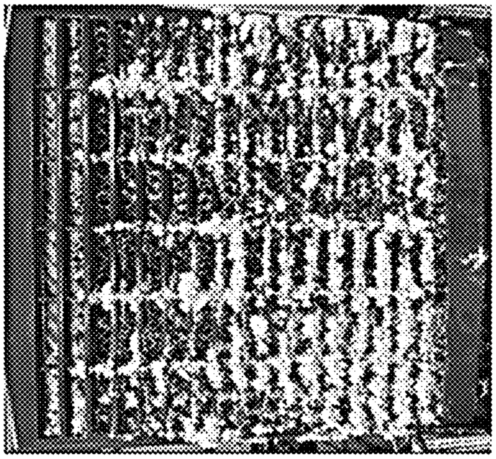
Figures 8A, 8B, 8C:
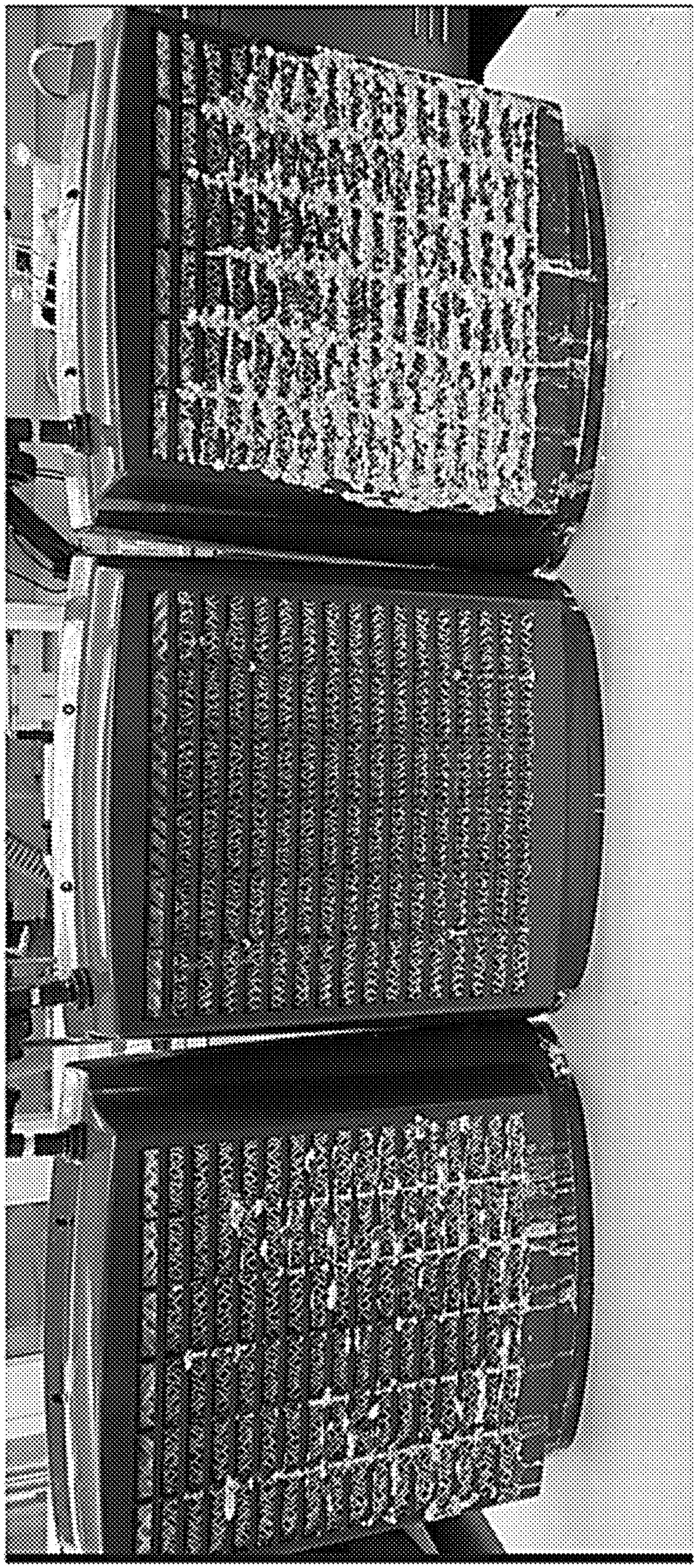
FIGS. 8A-8C provide a side by side comparison of the front of the industrial scale adiabatic cooling/humidification unit treated with no chemistry treatment (baseline) (FIG. 8B), treated with a nonionic surfactant (FIG. 8A), and treated with a nonionic surfactant and an antiscalant (FIG. 8C), as described in Example 6.

After three months, the industrial scale adiabatic cooling/humidification unit was reassessed qualitatively. The results for the no chemistry treatment (baseline) are set forth in FIGS. 5A-5C, the results for the nonionic surfactant treatment are set forth in FIGS. 6A-6C, and the results for the combination of the nonionic surfactant and the antiscalant treatment are set forth in FIGS. 7A-7C. In addition, a side by side comparison of the three industrial scale adiabatic cooling/humidification units is provided at FIGS. 8A-8C.

Figure 5A:
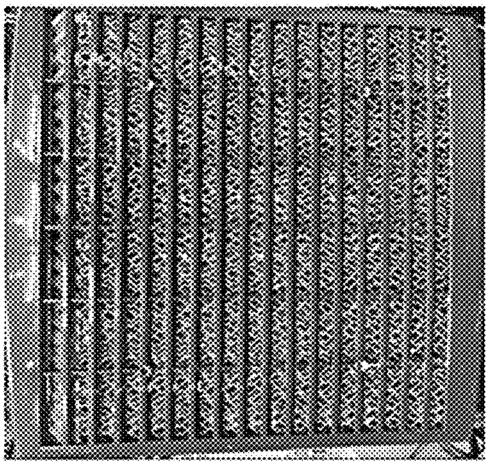
FIGS. 5A-5C show the qualitative assessment of an industrial scale adiabatic cooling/humidification unit with no chemistry treatment (baseline), as described in Example 6.
Figure 5B:
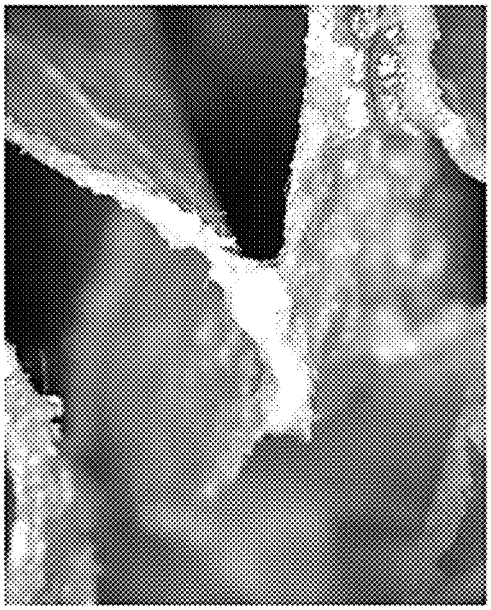
Figure 5C:
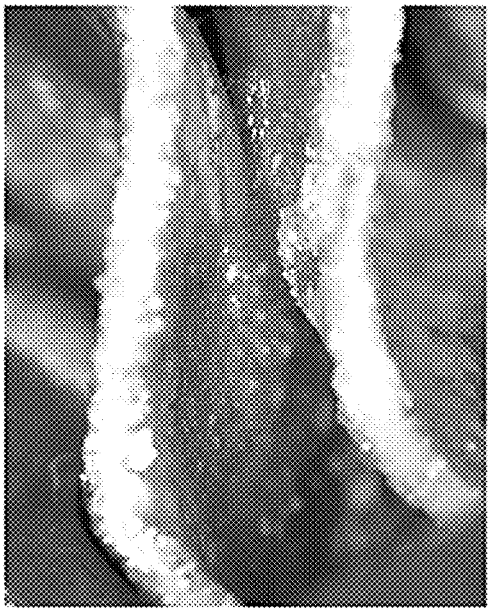

As is apparent from the results set forth in FIGS. 5A-5C, no treatment resulted in scale being evenly distributed throughout (i.e., at the surface and within) the media. However, treatment with the nonionic surfactant (FIGS. 6A-6C) or the combination of the nonionic surfactant and antiscalant (FIGS. 7A-7C) resulted in the scale formation being relocated to the surface of the porous media. In addition, treatment with the combination of the nonionic surfactant and the antiscalant resulted in visibly more scale at the surface of the porous media with the scale being soft and clustered. See FIGS. 8A-8C. In other words, treating with the nonionic surfactant or the combination of the nonionic surfactant and the antiscalant qualitatively appeared to produce significantly more scale; however, further inspection indicated that the scale has just been relocated to the surface. The relocation of scale to the surface improved the performance and longevity of the porous media.

Figures 9A, 9B, 9C:
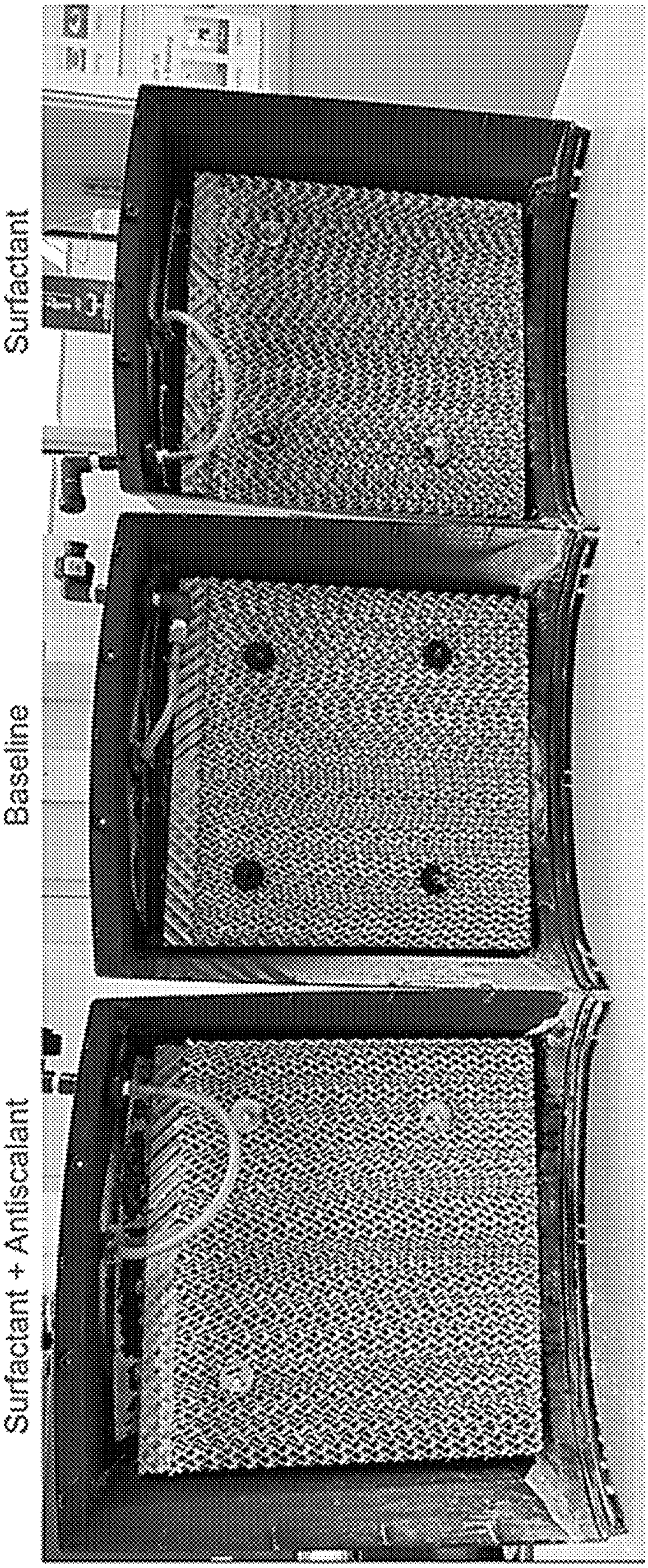
FIGS. 9A-9C provide a side by side comparison of the back of the industrial scale adiabatic cooling/humidification unit treated with no chemistry treatment (baseline) (FIG. 9B), treated with a nonionic surfactant (FIG. 9C), and treated with a nonionic surfactant and an antiscalant (FIG. 9A), as described in Example 6.

In addition, FIGS. 9A-9C show images of the back surface of the porous media. As is apparent from the results set forth in FIGS. 9A-9, the porous evaporative media treated with the nonionic surfactant (FIG. 9C) is darker than the baseline (FIG. 9B) indicating that the nonionic surfactant improved wettability of the evaporative porous media. In contrast, the porous evaporative media treated with the combination of the nonionic surfactant and the antiscalant (FIG. 9A) is lighter than the baseline (FIG. 9B) because scale had already began to form at the surface of the porous media.

These results show that despite the treatment programs showing visibly more scale on the surface of the porous media, the performance of the porous media is significantly enhanced. Without wishing to be bound by any particular theory, it is believed that the core of the porous media remains intact and relatively scale free as a result of the treatment programs.

Example 7

This example provides the humidity improvement and temperature drop exhibited by a lab scale adiabatic cooling/humidification unit, having (a) a clean porous media and (b) a porous media coated with calcium based spray chalk to simulate calcium scale, treated with a nonionic surfactant.

A lab scale adiabatic cooling/humidification unit, as depicted in FIG. 1, was built and used to test the ability of a nonionic surfactant to improve humidity and increase temperature drop in the lab scale adiabatic cooling/humidification unit, having (a) a clean porous media and (b) a chalked porous media. The lab scale adiabatic cooling/humidification unit had a porous evaporative media holder, a sump, water recirculation system (pump, pipe and, spray nozzle), air flowing system (fan and air conduit), makeup water, and blow down control. The water flow and airflow was adjustable to mimic the industrial water system of interest.

The water of the lab scale adiabatic cooling/humidification unit had a calcium concentration of 600 ppm and was treated with 200 ppm of the nonionic surfactant set forth in Table 6. The lab scale adiabatic cooling/humidification unit was operated for 14 days, and the change in humidity and change in temperature was measured at the end of the 14 days. The results are set forth in Table 6.

TABLE 6

Humidity Improvement and Temperature Drop

| Porous Media | Treatment | Humidity (%) | Δ Temperature Drop | Humidity Change (%) | Δ Temperature Drop (%) |
|---|---|---|---|---|---|
| Clean | None (baseline) | 47.5 | 7.30 | — | — |
| Clean | ethylene oxide - propylene oxide copolymer | 48.2 | 7.44 | 101 | 102 |
| Clean | oxyalkylated alcohol | 50.2 | 7.89 | 105 | 108 |
| Chalked | None (Baseline) | 47.4 | 6.68 | — | — |
| Chalked | ethylene oxide - propylene oxide copolymer | 49.8 | 6.70 | 105 | 100 |
| Chalked | oxyalkylated alcohol | 56.0 | 7.80 | 118 | 117 |

As is apparent from the results set forth in Table 6, treatment with a nonionic surfactant increased the humidity (%) and increased the temperature drop relative to the untreated adiabatic cooling/humidification unit in both (a) a clean porous media and (b) a chalked porous media. In addition, Table 6 shows that treatment with a nonionic surfactant improved performance more in the chalked porous media than the clean porous media. Furthermore, the humidity and temperature drop performances were improved more significantly by oxyalkylated alcohol than ethylene oxide-propylene oxide copolymer in both (a) a clean porous media and (b) a chalked porous media.

Example 8

This example provides the results of a bump test of an industrial scale adiabatic cooling/humidification unit treated with a nonionic surfactant.

An industrial scale adiabatic cooling/humidification unit, as depicted in FIG. 1 was used to test the ability of a nonionic surfactant to improve wetting, humidification, and increase temperature drop on heavily scaled porous media. The industrial scale adiabatic cooling/humidification unit had a porous evaporative media holder, a sump, water recirculation system (pump, pipe and, spray nozzle), air flowing system (fan and air conduit), and makeup water. The water recirculation flow was initially set at 15 gpm for baseline data collection. The water recirculation flow was decreased to 5 gpm to further dry the media and artificially reduce performance further. After 2 hours of additional baseline measurements at 5 gpm water flow, increments of oxyalkylated alcohol were injected into the water sump and allowed to stabilize while measuring humidity and temperature. The recirculation water flow rate was then increased back to 15 gpm. After 1 hour, the basin was manually blowdown to clear the system of product.

Figure 10:
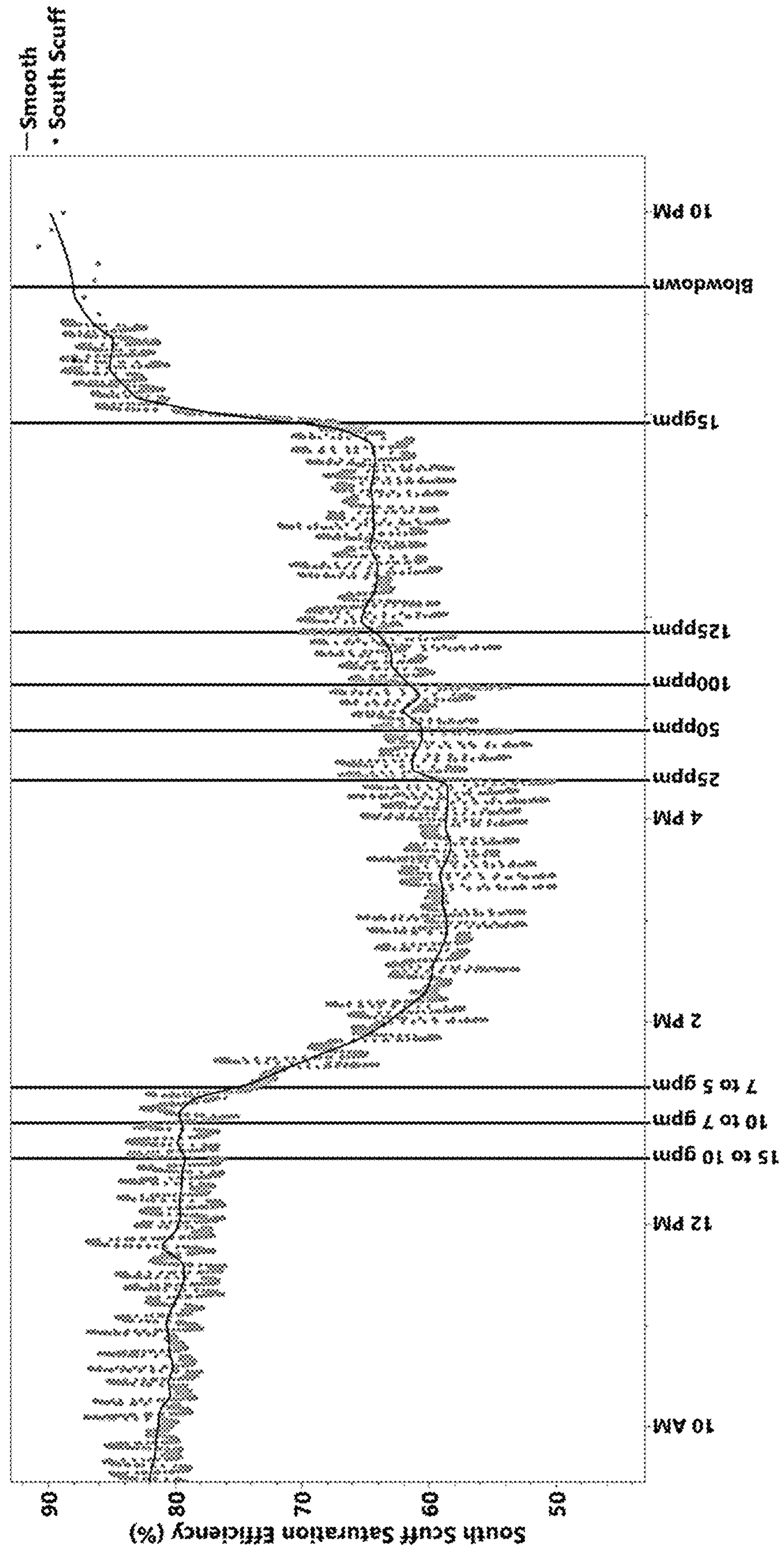
FIG. 10 provides the results of a bump test of an industrial scale adiabatic cooling/humidification unit treated with a nonionic surfactant, as described in Example 8.

The saturation efficiency of the bump test are set forth in FIG. 10. As is apparent from the results set forth in FIG. 10, the saturation efficiency percentage increased by approximately 5% with each application of oxyalkylated alcohol. More particularly, when flow was returned to 15 gpm, the saturation efficiency percentage increased to a new baseline, which was greater than the baseline prior.

Figures 11A, 11B:
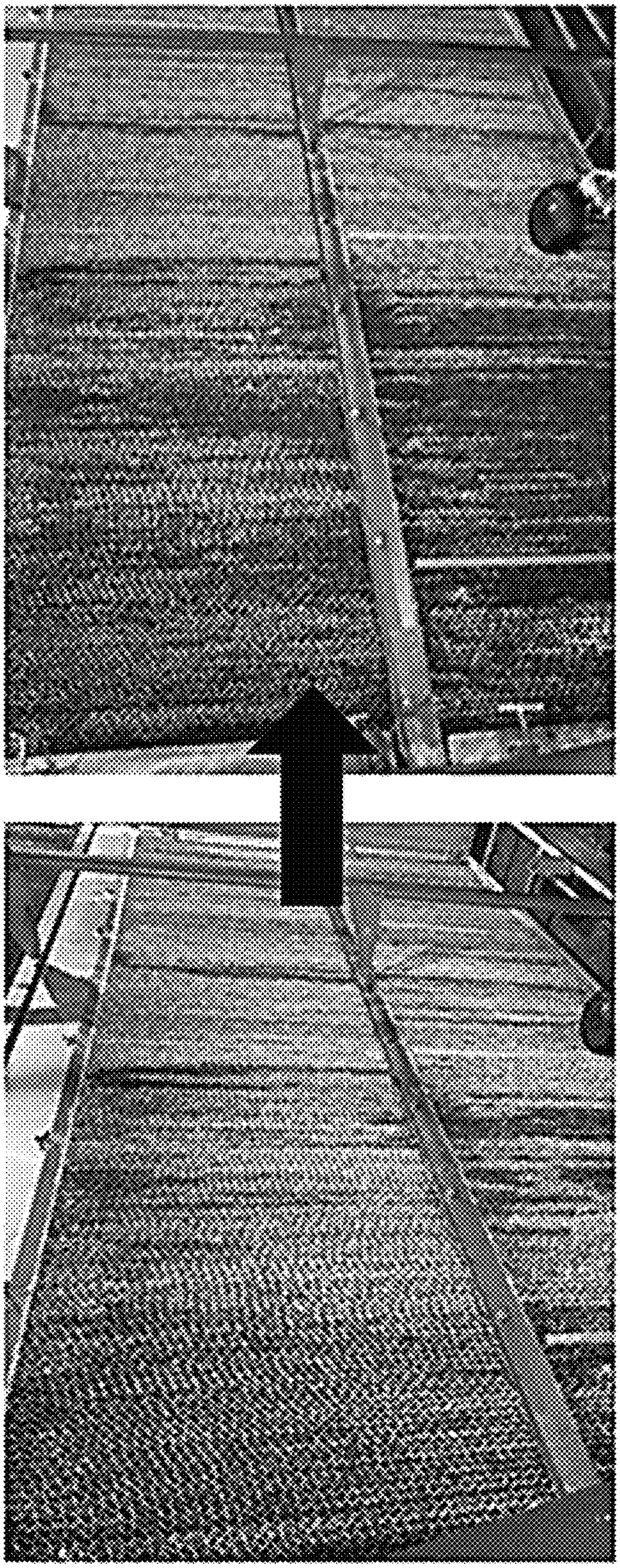
FIGS. 11A and 11B shows the qualitative assessment of an industrial scale adiabatic cooling/humidification unit with no chemistry treatment (baseline) (FIG. 11A) and treated with a nonionic surfactant (FIG. 11B), as described in Example 8.

In addition, the evaporative porous media was evaluated qualitatively prior too addition of the nonionic surfactant (FIG. 11A) and after the addition of the nonionic surfactant (FIG. 11B). As is apparent from the results set forth in FIGS. 11A and 11B, treatment with a nonionic surfactant significantly improved wettability, as evidenced by the darker color of the evaporative porous media in FIG. 11B.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of improving an evaporative performance of a porous evaporative media in a cooling system that utilizes water evaporation for heat transfer, the method comprising contacting the porous evaporative media with a scale relocating-effective amount of a nonionic surfactant and no antiscalant, wherein the nonionic surfactant comprises a $C_8$-$C_{22}$ alcohol ethoxylate, a $C_8$-$C_{22}$ ethoxylate, a $C_8$-$C_{22}$ alkyl phenol ethoxylate, a terminally blocked $C_8$-$C_{22}$ alcohol polyethylene glycol ether, a monododecyl ether, a nonoxynol, an ethoxylated $C_8$-$C_{22}$ ester, an ethoxylated amine, a $C_8$-$C_{22}$ amide, a polyethoxylated tallow amine, a poloxamer, a $C_8$-$C_{22}$ ester of a polyhydroxy compound, an alkyl polyglucoside, myristamine oxide, a polyethylene oxide polymer, a polypropylene polymer, a polyethylene oxide/polypropylene oxide copolymer, octaethylene glycol monododecyl ether, pentaethylene glycol monododecyl ether, Triton X-100, cocamide monoethanolamine, cocamide diethanolamine, glycerol monostearate, glycerol monolaurate, sorbitan monolaurate, sorbitan monostearate, sorbitan tristearate, Tween 20, Tween 40, Tween 60, Tween 80, decyl glucoside, lauryl glucoside, octyl glucoside, or a combination thereof.

2. The method of claim 1, comprising contacting the porous evaporative media with the nonionic surfactant and optionally a chelant before using the porous evaporative media in the cooling system.

3. The method of claim 1, wherein the cooling system comprises an adiabatic cooling system, an evaporative cooling system, or a humidification system.

4. The method of claim 1, wherein the cooling system is used in a data center, an automotive application, an industrial application, a commercial application, or an agricultural application.

5. The method of claim 1, wherein the nonionic surfactant comprises polyethylene oxide, polypropylene oxide, polyethylene oxide/polypropylene oxide, or a combination thereof.

6. The method of claim 1, wherein the nonionic surfactant comprises a C8-C22 alcohol ethoxylate, a C8-C22 ethoxylate, a C8-C22 alkyl phenol ethoxylate, a terminally blocked C8-C22 alcohol polyethylene glycol ether, a monododecyl ether, a nonoxynol, an ethoxylated C8-C22 ester, an ethoxylated amine, a C8-C22 amide, a polyethoxylated tallow amine, a poloxamer, a C8-C22 ester of a polyhydroxy compound, an alkyl polyglucoside, myristamine oxide, or a combination thereof.

7. The method of claim 1, wherein the nonionic surfactant comprises a polyethylene oxide polymer, a polypropylene polymer, a polyethylene oxide/polypropylene oxide copolymer, octaethylene glycol monododecyl ether, pentaethylene glycol monododecyl ether, Triton X-100, cocamide monoethanolamine, cocamide diethanolamine, glycerol monostearate, glycerol monolaurate, sorbitan monolaurate, sorbitan monostearate, sorbitan tristearate, Tween 20, Tween 40, Tween 60, Tween 80, decyl glucoside, lauryl glucoside, octyl glucoside, or a combination thereof.

8. The method of claim 1, comprising contacting the porous evaporative media in the cooling system with the nonionic surfactant and optionally a chelant continuously for a period of from about one day to about one year.

9. The method of claim 1, comprising contacting the porous evaporative media in the cooling system with the nonionic surfactant and optionally a chelant continuously for a period of from about one day to about three months.

10. The method of claim 1, comprising contacting the porous evaporative media in the cooling system with the nonionic surfactant and optionally a chelant continuously for a period of from about one day to about one month.

11. The method of claim 1, further comprising contacting the porous evaporative media with a chelant.

12. The method of claim 11, wherein the chelant comprises ethylenediaminetetraacetic acid (EDTA), ethyleneglycol bis(2-aminoethyl ether)-N,N,N',N' tetraacetic acid (EGTA), carboxymethyl cellulose (CMC), nitrilotriacetic acid (NTA), diethylenetriaminepentaacetic acid (DTPA), methylglycinediacetic acid, [[(2-hydroxyethyl)imino]bis(methylene)]-bisphosphonic acid, 4-(phosphonomethyl)-2-hydroxy-2-oxo-1,4,2-oxazaphosphorinane, a salt thereof, or a combination thereof.

13. The method of claim 1, wherein the porous evaporative media comprises one or more corrugated sheets.

14. The method of claim 13, wherein the one or more corrugated sheets comprises a fibrous material, a filler, a polymer binder, or a combination thereof.

15. The method of claim 1, comprising contacting the porous evaporative media with the nonionic surfactant and optionally a chelant while the porous evaporative media is being used in the cooling system.

16. The method of claim 15, comprising combining water of the cooling system with the nonionic surfactant and optionally a chelant to produce a treated cooling water for relocating scale formation on the porous evaporative media.

17. The method of claim 16, comprising continuously feeding the treated cooling water through the porous evaporative media.

18. The method of claim 16, wherein the concentration of the nonionic surfactant in the treated cooling water is from about 10 ppm to about 200 ppm.

19. The method of claim 16, further comprising adjusting the pH of the treated cooling water with a pH adjusting agent.

20. The method of claim 19, wherein the pH adjusting agent comprises sulfuric acid, acetic acid, citric acid, nitric acid, propionic acid, tartaric acid, fumaric acid, phosphoric acid, salts thereof, or a combination thereof.

* * * * *